US011050272B2

(12) United States Patent
Smith

(10) Patent No.: US 11,050,272 B2
(45) Date of Patent: Jun. 29, 2021

(54) OPEN LINE DETECTION DURING PRE-CHARGE

(71) Applicant: NIO USA, Inc., San Jose, CA (US)

(72) Inventor: Alexander J. Smith, White Lake, MI (US)

(73) Assignee: NIO USA, Inc., San Jose, CA (US)

( * ) Notice: Subject to any disclaimer, the term of this patent is extended or adjusted under 35 U.S.C. 154(b) by 480 days.

(21) Appl. No.: 15/830,783

(22) Filed: Dec. 4, 2017

(65) Prior Publication Data

US 2019/0173298 A1    Jun. 6, 2019

(51) Int. Cl.
*H02J 7/00* (2006.01)
*B60L 3/04* (2006.01)
*B60L 53/00* (2019.01)

(52) U.S. Cl.
CPC .............. *H02J 7/0031* (2013.01); *B60L 3/04* (2013.01); *B60L 53/00* (2019.02); *H02J 7/0072* (2013.01); *H02J 7/00045* (2020.01); *H02J 7/0071* (2020.01)

(58) Field of Classification Search
CPC .................. H02J 7/0031; H02J 7/0072; H02J 2007/0001; H02J 7/0073; B60L 53/00; B60L 3/04
See application file for complete search history.

(56) References Cited

U.S. PATENT DOCUMENTS

| 6,488,107 B1* | 12/2002 | Ochiai | B60L 3/003 |
|---|---|---|---|
| | | | 180/65.25 |
| 2004/0185317 A1* | 9/2004 | Aoyagi | H01M 8/04225 |
| | | | 429/429 |
| 2011/0049977 A1* | 3/2011 | Onnerud | B60L 3/0046 |
| | | | 307/9.1 |
| 2012/0022744 A1* | 1/2012 | Endo | B60L 53/56 |
| | | | 701/36 |
| 2013/0105264 A1 | 5/2013 | Ruth et al. | |
| 2013/0179062 A1 | 7/2013 | Yasashi et al. | |
| 2013/0200690 A1* | 8/2013 | Rini | H02J 7/0031 |
| | | | 307/9.1 |

(Continued)

FOREIGN PATENT DOCUMENTS

CN            103337673        10/2013

OTHER PUBLICATIONS

"State of Health (SOH) Determination, What is the SOH?," Woodbank Communications Ltd, 2005, 3 pages.

(Continued)

*Primary Examiner* — Jared Fureman
*Assistant Examiner* — Emmanuel Dominique
(74) *Attorney, Agent, or Firm* — Sheridan Ross P.C.

(57) ABSTRACT

Systems of an electrical vehicle and the operations thereof are provided. Inflow current occurs when components of differing voltage are connected absent mitigating components. Batteries and other components may be damaged by unrestrained inflow current. By performing a pre-charge, a battery line is gradually brought up to the voltage source potential. Additionally, by determining the observed voltage, while a lesser voltage is applied, to a connected component, a determination may be made if charging should or should not continue. If the observed voltage is less than that applied, a problem may be present and charging discontinued. As a result, high-voltage current that may be inadvertently exposed may be curtailed.

20 Claims, 16 Drawing Sheets

(56) References Cited

U.S. PATENT DOCUMENTS

| | | | |
|---|---|---|---|
| 2015/0077058 A1* | 3/2015 | Jung | H01M 10/44 |
| | | | 320/112 |
| 2015/0360578 A1 | 12/2015 | Duan et al. | |
| 2016/0137075 A1* | 5/2016 | Zeng | B60L 15/025 |
| | | | 320/134 |
| 2016/0299197 A1 | 10/2016 | Kim | |
| 2016/0347149 A1 | 12/2016 | Rustoni | |
| 2017/0331162 A1 | 11/2017 | Clarke et al. | |
| 2018/0106869 A1 | 4/2018 | Gelso et al. | |
| 2018/0134171 A1 | 5/2018 | Hyde et al. | |
| 2018/0143262 A1 | 5/2018 | Kondo | |
| 2018/0188332 A1 | 7/2018 | Newman et al. | |
| 2019/0004118 A1 | 1/2019 | Eichelberger et al. | |

OTHER PUBLICATIONS

Official Action for U.S. Appl. No. 15/396,057, dated Nov. 23, 2019 14 pages.

Final Action for U.S. Appl. No. 15/396,057, dated Jun. 20, 2019 19 pages.

Notice of Allowance for U.S. Appl. No. 15/396,057, dated Oct. 28, 2019 5 pages.

\* cited by examiner

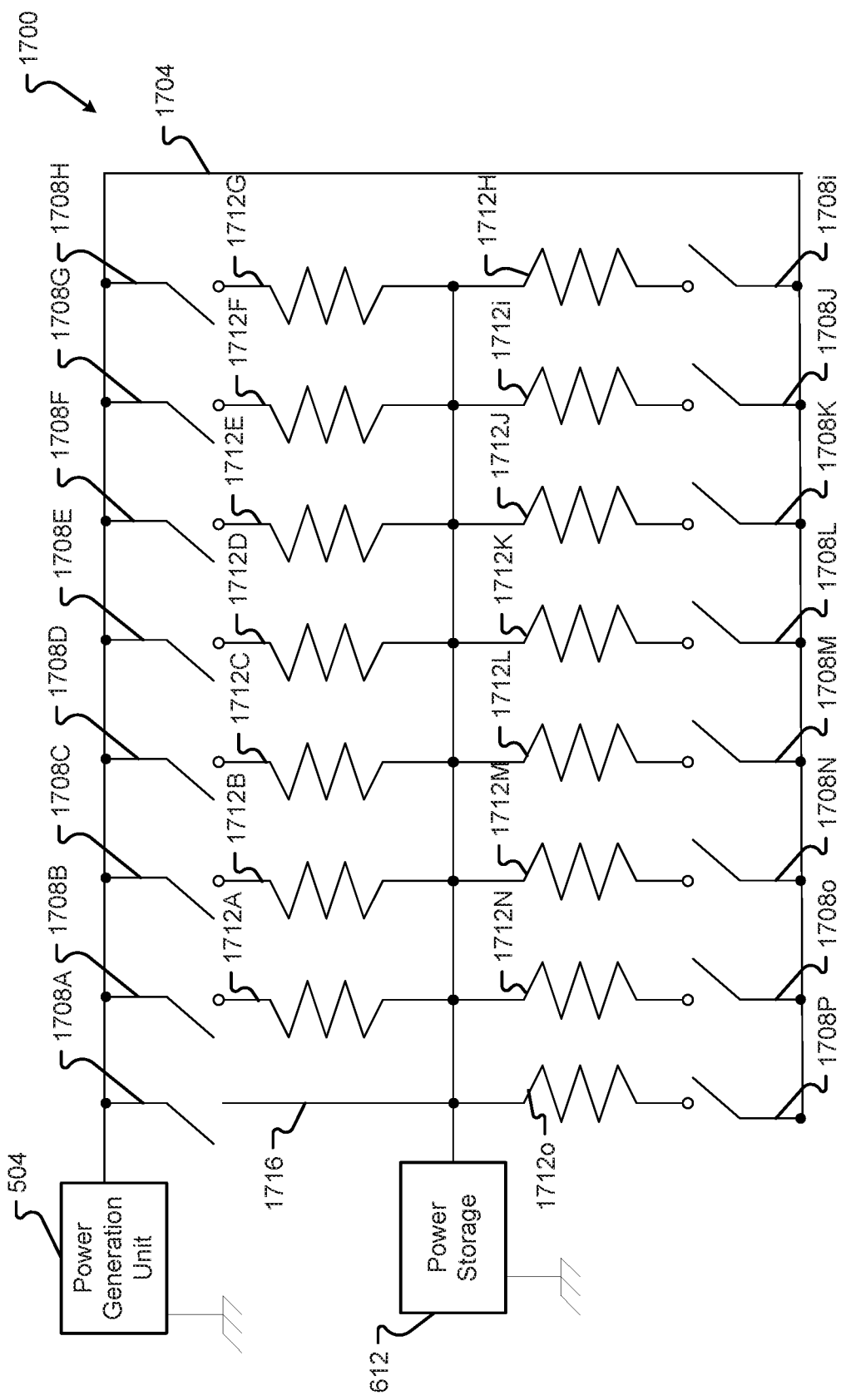

OPEN LINE DETECTION DURING PRE-CHARGE

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

BRIEF DESCRIPTION OF THE DRAWINGS

FIG. 17 is a schematic of a resistor network associated with one or more embodiments described herein.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
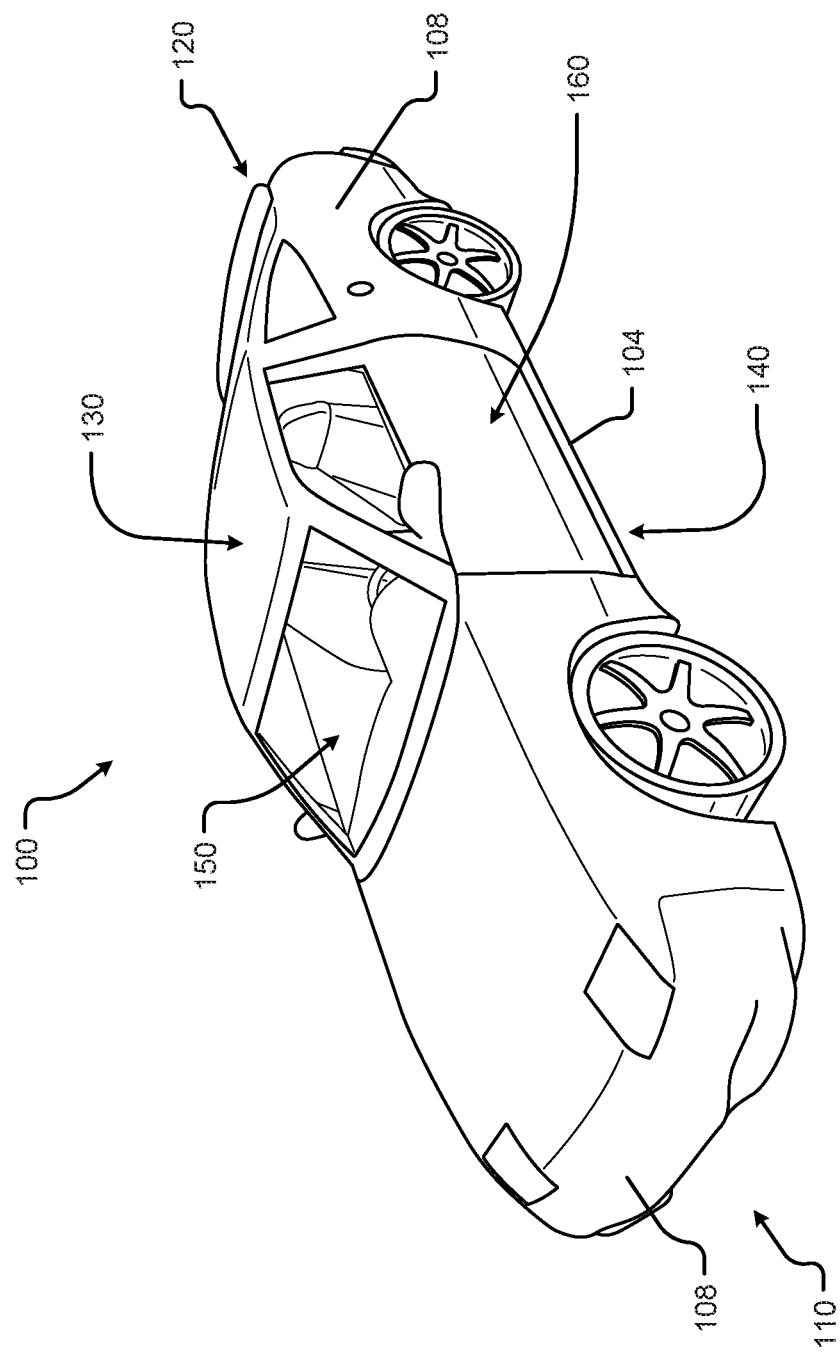
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
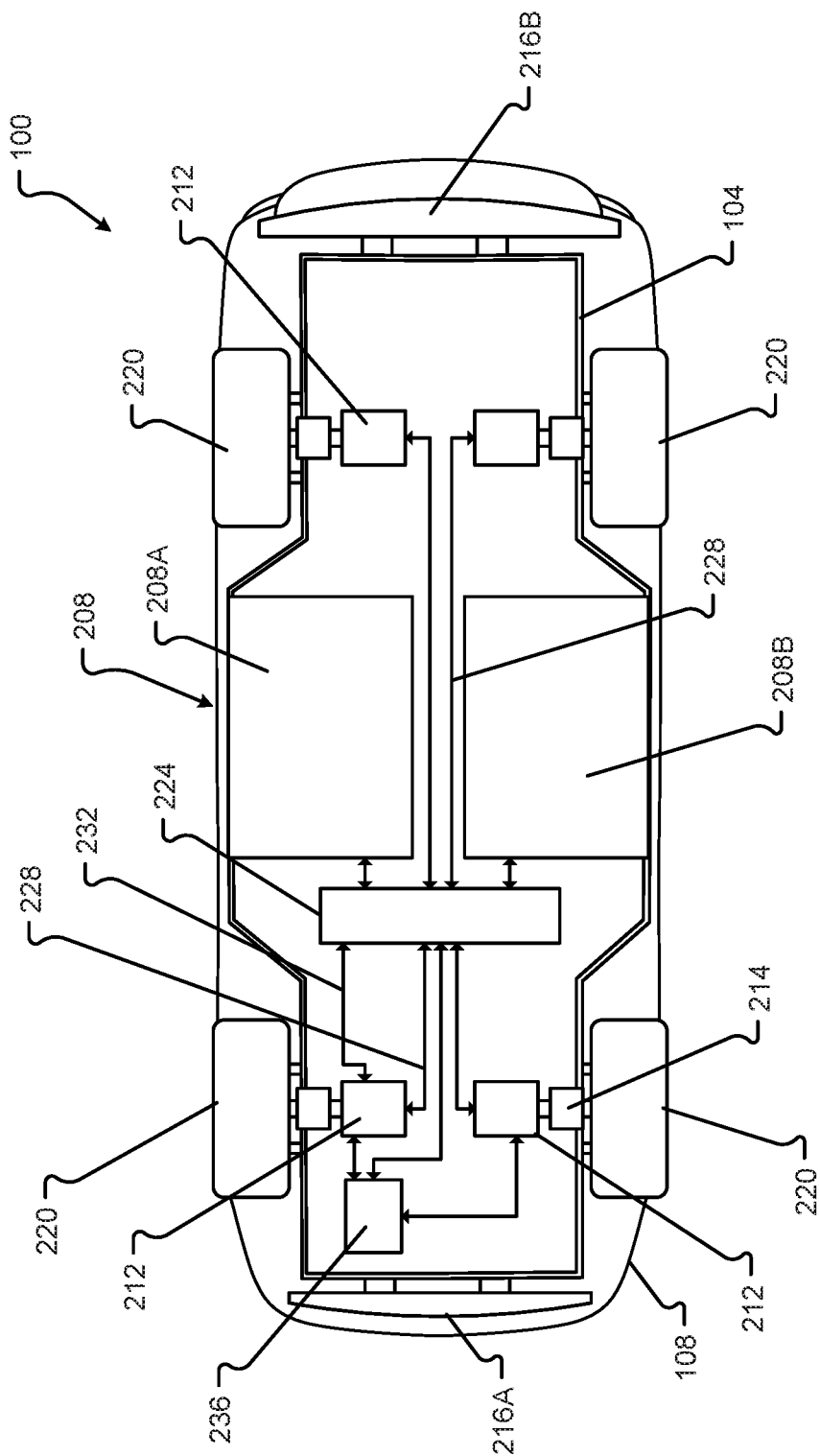
FIG. 2 shows a plan view of the vehicle in accordance with embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 208A, 208B, motors 212, engines, safety equipment, controllers, user interfaces, interiors exterior components, body panels 108, bumpers 216, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208A, 208B (e.g., battery unit, capacitor unit, etc.) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
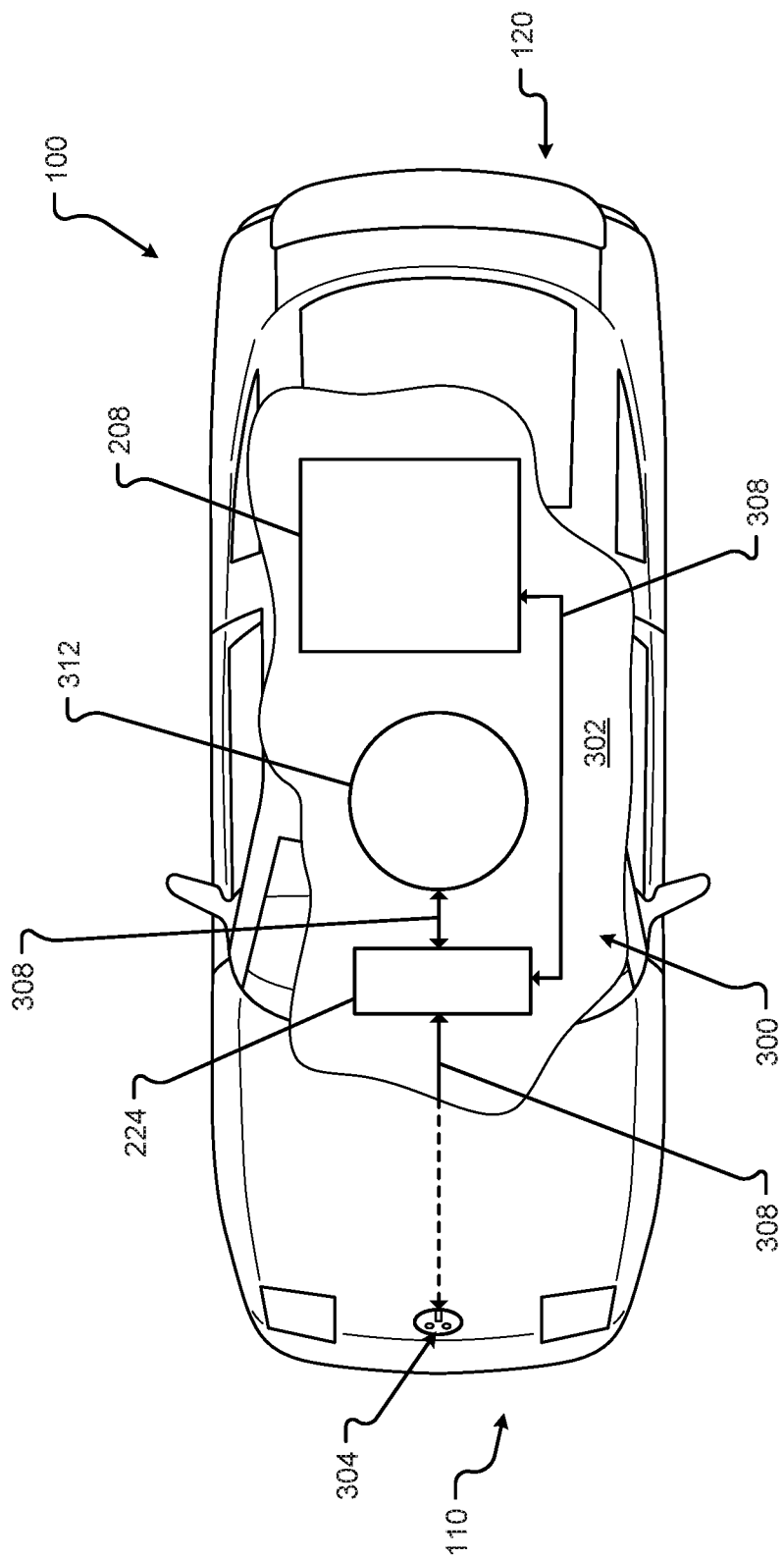
FIG. 3 shows a plan view of the vehicle in accordance with embodiments of the present disclosure.
Figure 4:
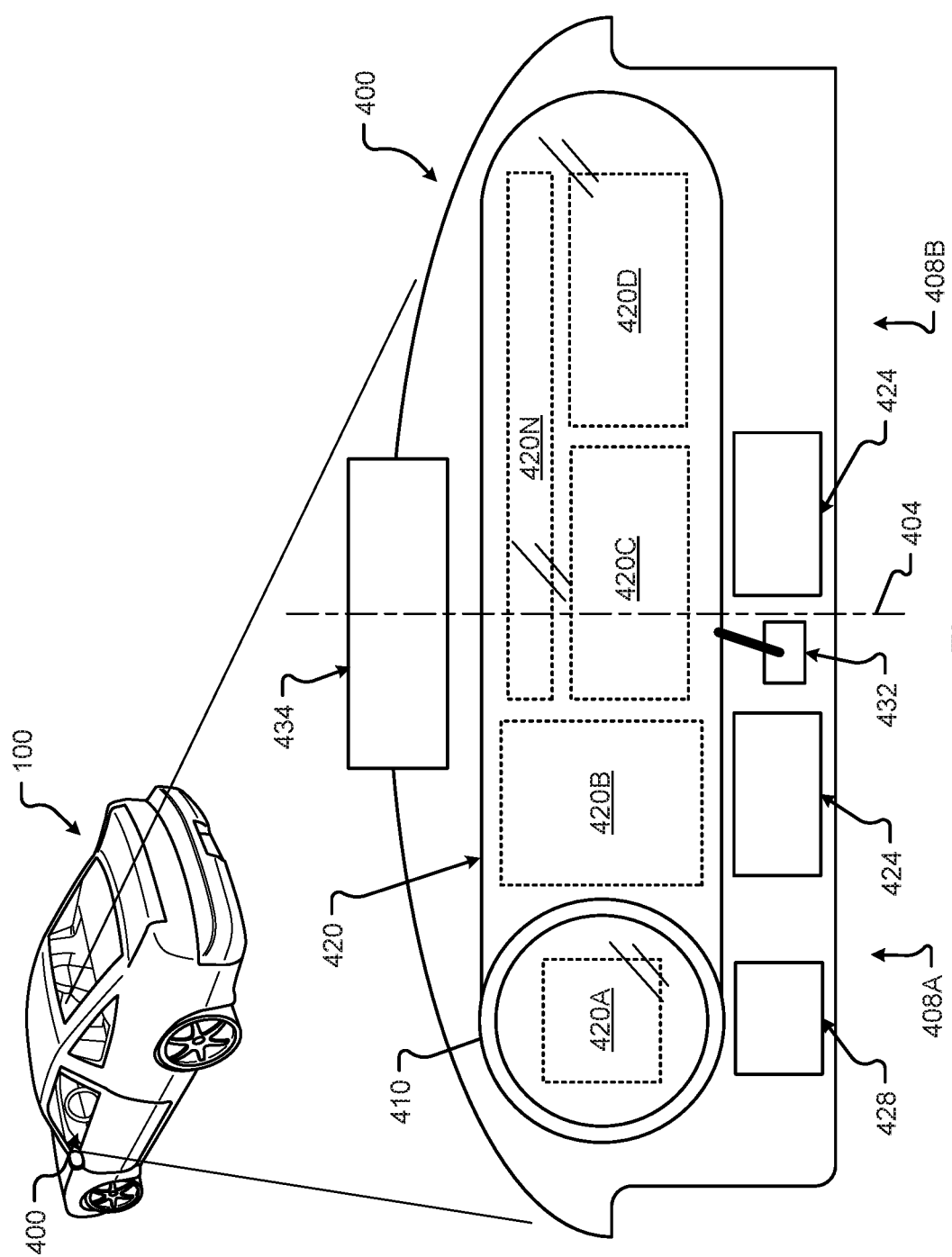
FIG. 4 shows an embodiment of the instrument panel of the vehicle according to one embodiment of the present disclosure.

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
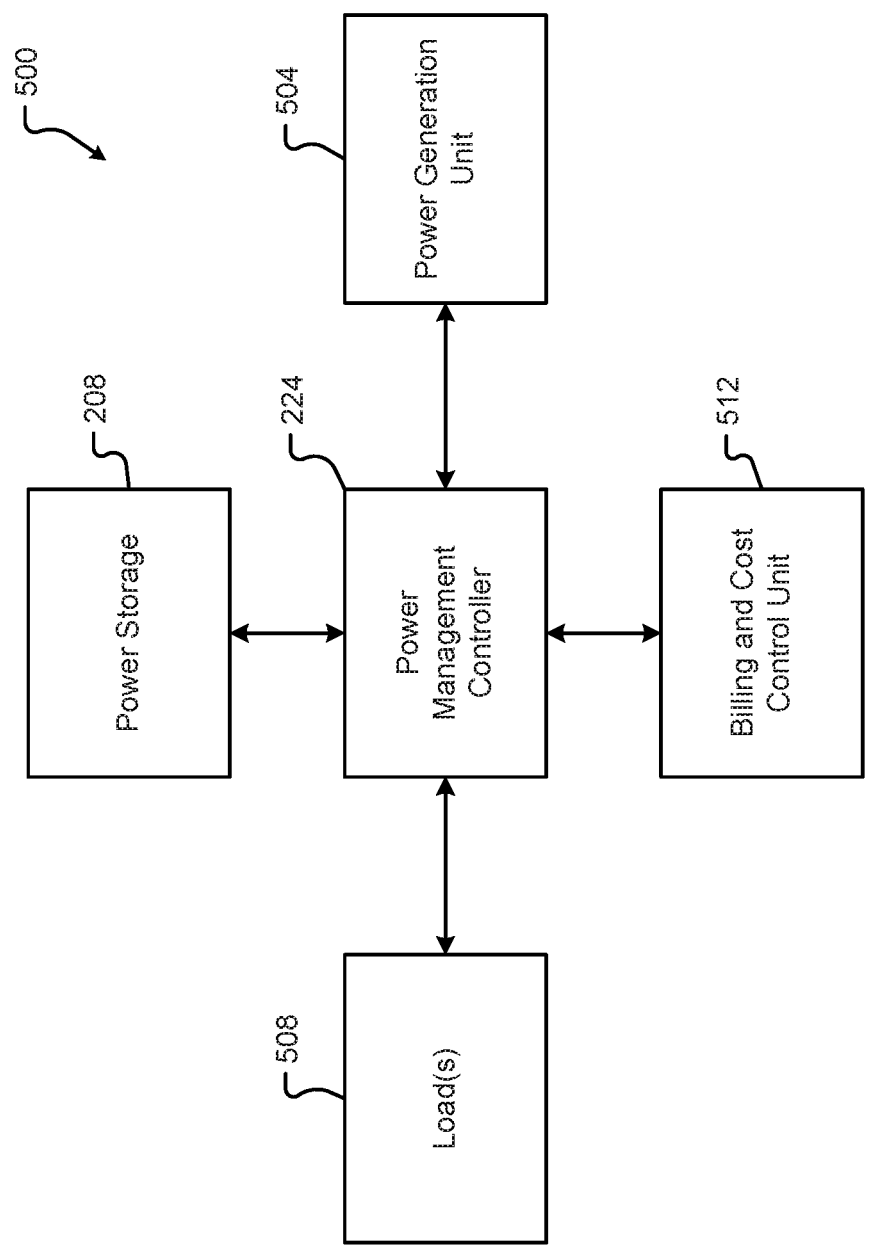
FIG. 5 is a block diagram of an embodiment of an electrical system of the vehicle.

An embodiment of the electrical system 500 associated with the vehicle 100 may be as shown in FIG. 5. The electrical system 500 can include power source(s) that generate power, power storage that stores power, and/or load(s) that consume power. Power sources may be associated with a power generation unit 504. Power storage may be associated with a power storage system 208. Loads may be associated with loads 508. The electrical system 500 may be managed by a power management controller 224. Further, the electrical system 500 can include one or more other interfaces or controllers, which can include the billing and cost control unit 512.

Figure 6:
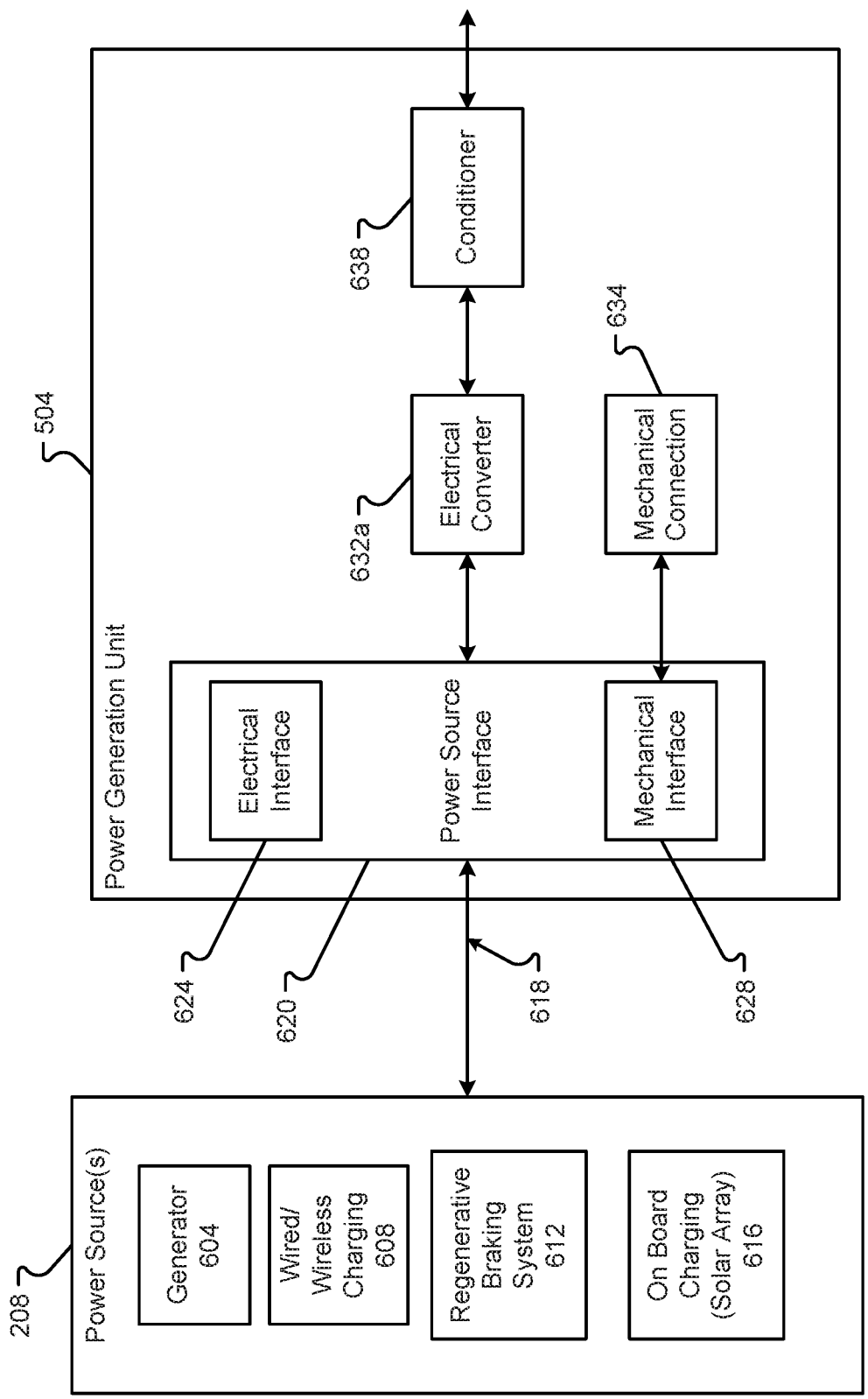
FIG. 6 is a block diagram of an embodiment of a power generation unit associated with the electrical system of the vehicle.

The power generation unit 504 may be as described in conjunction with FIG. 6. The power storage component 208 may be as described in conjunction with FIG. 7. The loads 508 may be as described in conjunction with FIG. 8.

The billing and cost control unit 512 may interface with the power management controller 224 to determine the amount of charge or power provided to the power storage 208 through the power generation unit 504. The billing and cost control unit 512 can then provide information for billing the vehicle owner. Thus, the billing and cost control unit 512 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit.

The power management controller 224 can be a computer or computing system(s) and/or electrical system with associated components, as described herein, capable of managing the power generation unit 504 to receive power, routing the power to the power storage 208, and then providing the power from either the power generation unit 504 and/or the power storage 208 to the loads 508. Thus, the power management controller 224 may execute programming that controls switches, devices, components, etc. involved in the reception, storage, and provision of the power in the electrical system 500.

An embodiment of the power generation unit 504 may be as shown in FIG. 6. Generally, the power generation unit 504 may be electrically coupled to one or more power sources 208. The power sources 208 can include power sources internal and/or associated with the vehicle 100 and/or power sources external to the vehicle 100 to which the vehicle 100 electrically connects. One of the internal power sources can include an on board generator 604. The generator 604 may be an alternating current (AC) generator, a direct current (DC) generator or a self-excited generator. The AC generators can include induction generators, linear electric generators, and/or other types of generators. The DC generators can include homopolar generators and/or other types of generators. The generator 604 can be brushless or include brush contacts and generate the electric field with permanent magnets or through induction. The generator 604 may be mechanically coupled to a source of kinetic energy, such as an axle or some other power take-off. The generator 604 may also have another mechanical coupling to an exterior source of kinetic energy, for example, a wind turbine.

Another power source 208 may include wired or wireless charging 608. The wireless charging system 608 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include connectors, wired interconnections, the controllers, etc. The wired and wireless charging systems 608 can provide power to the power generation unit 504 from external power sources 208.

Internal sources for power may include a regenerative braking system 612. The regenerative braking system 612 can convert the kinetic energy of the moving car into electrical energy through a generation system mounted within the wheels, axle, and/or braking system of the vehicle 100. The regenerative braking system 612 can include any coils, magnets, electrical interconnections, converters, controllers, etc. required to convert the kinetic energy into electrical energy.

Another source of power 208, internal to or associated with the vehicle 100, may be a solar array 616. The solar array 616 may include any system or device of one or more solar cells mounted on the exterior of the vehicle 100 or integrated within the body panels of the vehicle 100 that provides or converts solar energy into electrical energy to provide to the power generation unit 504.

The power sources 208 may be connected to the power generation unit 504 through an electrical interconnection 618. The electrical interconnection 618 can include any wire, interface, bus, etc. between the one or more power sources 208 and the power generation unit 504.

The power generation unit 504 can also include a power source interface 620. The power source interface 620 can be any type of physical and/or electrical interface used to receive the electrical energy from the one or more power sources 208; thus, the power source interface 620 can include an electrical interface 624 that receives the electrical energy and a mechanical interface 628 which may include wires, connectors, or other types of devices or physical connections. The mechanical interface 608 can also include a physical/electrical connection 634 to the power generation unit 504.

The electrical energy from the power source 208 can be processed through the power source interface 624 to an electric converter 632. The electric converter 632 may convert the characteristics of the power from one of the power sources into a useable form that may be used either by the power storage 208 or one or more loads 508 within the vehicle 100. The electrical converter 624 may include any electronics or electrical devices and/or component that can change electrical characteristics, e.g., AC frequency, amplitude, phase, etc. associated with the electrical energy provided by the power source 208. The converted electrical energy may then be provided to an optional conditioner 638. The conditioner 638 may include any electronics or electrical devices and/or component that may further condition the converted electrical energy by removing harmonics, noise, etc. from the electrical energy to provide a more stable and effective form of power to the vehicle 100.

Figure 7:
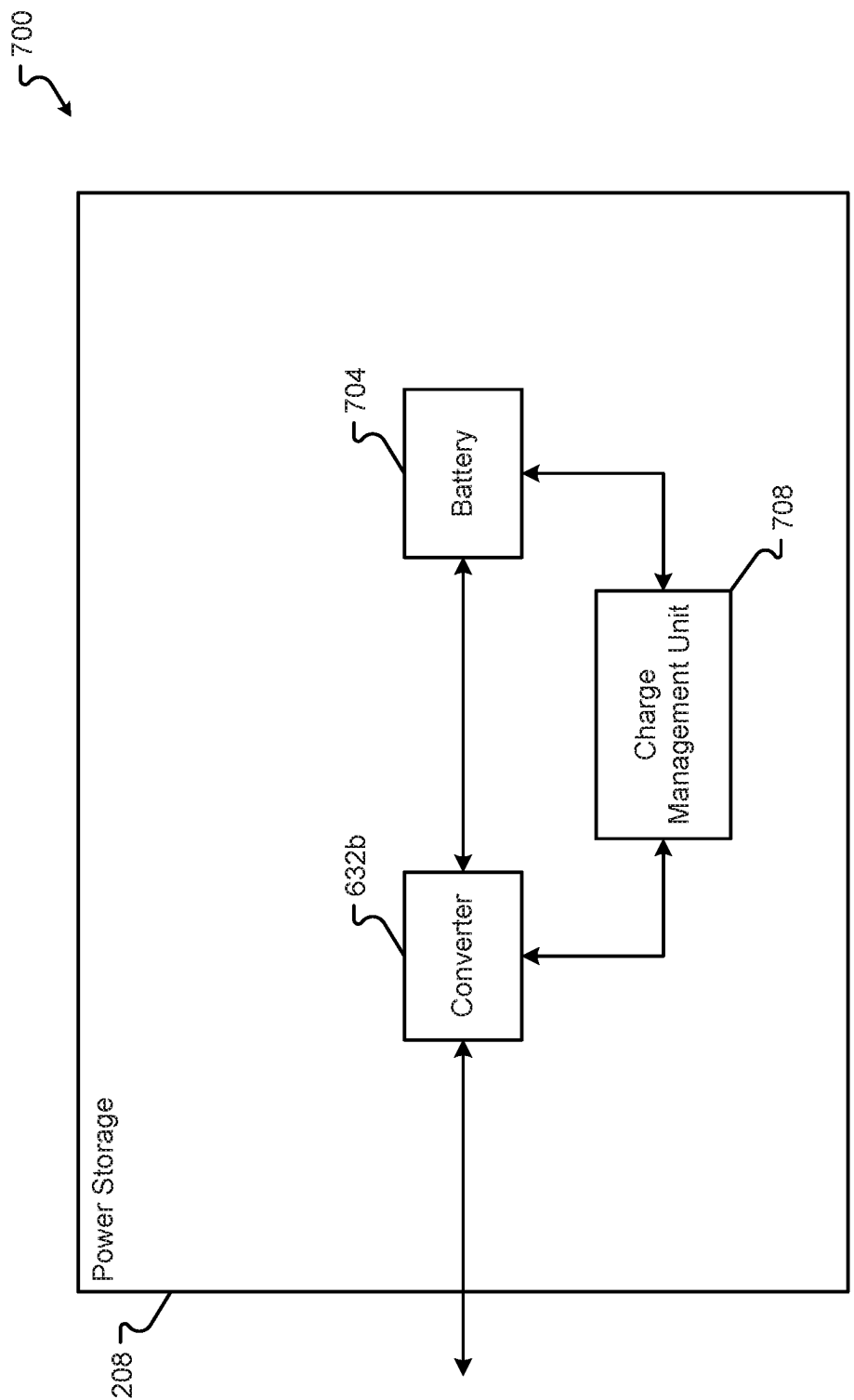
FIG. 7 is a block diagram of an embodiment of power storage associated with the electrical system of the vehicle.

An embodiment of the power storage 208 may be as shown in FIG. 7. The power storage unit can include an electrical converter 632b, one or more batteries, one or more rechargeable batteries, one or more capacitors, one or more accumulators, one or more supercapacitors, one or more ultrabatteries, and/or superconducting magnetics 704, and/or a charge management unit 708. The converter 632b may be the same or similar to the electrical converter 632a shown in FIG. 6. The converter 632b may be a replacement for the electric converter 632a shown in FIG. 6 and thus eliminate the need for the electrical converter 632a as shown in FIG. 6. However, if the electrical converter 632a is provided in the power generation unit 504, the converter 632b, as shown in the power storage unit 208, may be eliminated. The converter 632b can also be redundant or different from the electrical converter 632a shown in FIG. 6 and may provide a different form of energy to the battery and/or capacitors 704. Thus, the converter 632b can change the energy characteristics specifically for the battery/capacitor 704.

The battery 704 can be any type of battery for storing electrical energy, for example, a lithium ion battery, a lead acid battery, a nickel cadmium battery, etc. Further, the battery 704 may include different types of power storage systems, such as, ionic fluids or other types of fuel cell systems. The energy storage 704 may also include one or more high-capacity capacitors 704. The capacitors 704 may be used for long-term or short-term storage of electrical energy. The input into the battery or capacitor 704 may be different from the output, and thus, the capacitor 704 may be charged quickly but drain slowly. The functioning of the converter 632 and battery capacitor 704 may be monitored or managed by a charge management unit 708.

The charge management unit 708 can include any hardware (e.g., any electronics or electrical devices and/or components), software, or firmware operable to adjust the operations of the converter 632 or batteries/capacitors 704. The charge management unit 708 can receive inputs or periodically monitor the converter 632 and/or battery/capacitor 704 from this information; the charge management unit 708 may then adjust settings or inputs into the converter 632 or battery/capacitor 704 to control the operation of the power storage system 208.

Figure 8:
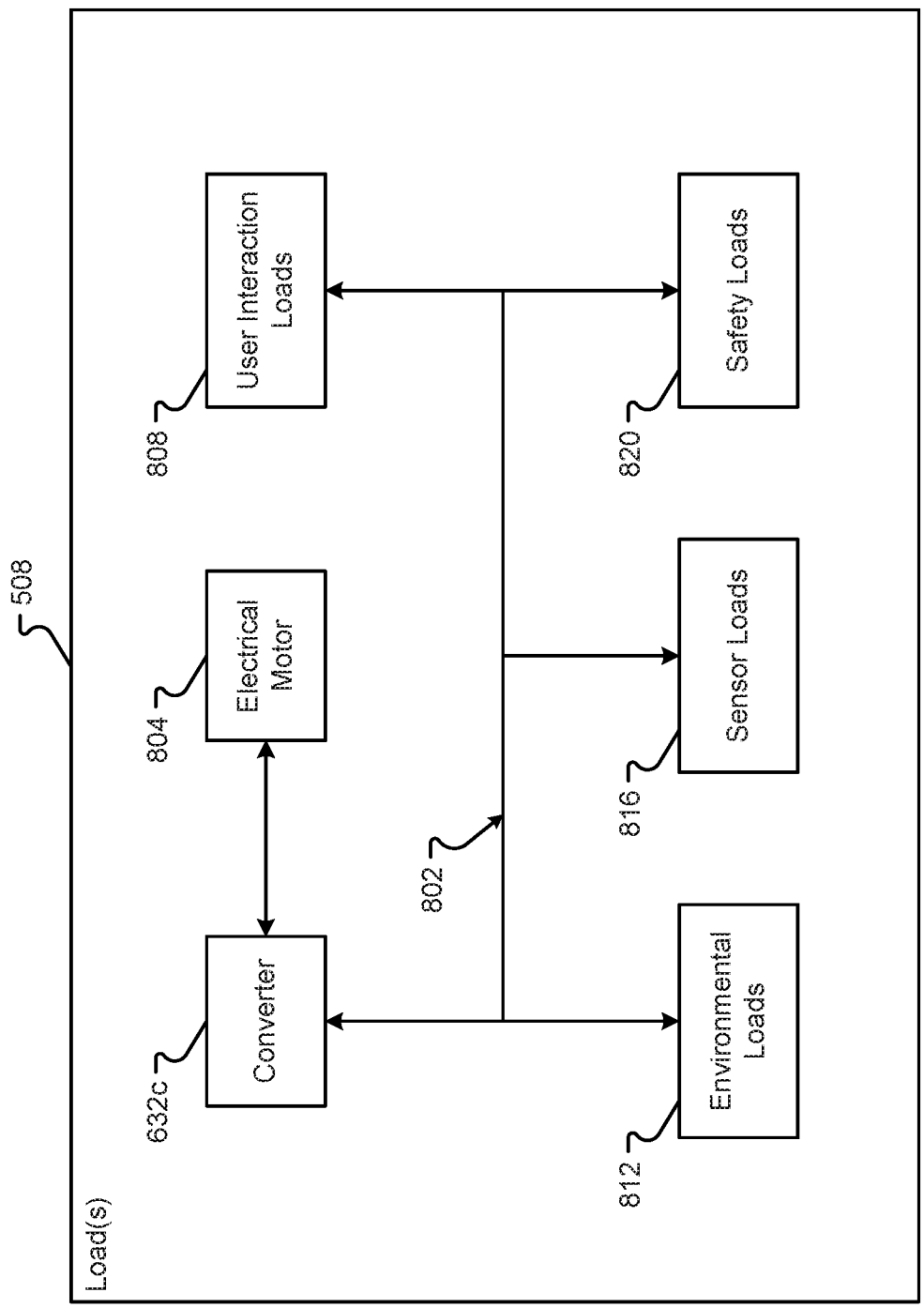
FIG. 8 is a block diagram of an embodiment of loads associated with the electrical system of the vehicle.

An embodiment of one or more loads 508 associated with the vehicle 100 may be as shown in FIG. 8. The loads 508 may include a bus or electrical interconnection system 802, which provides electrical energy to one or more different loads within the vehicle 100. The bus 802 can be any number of wires or interfaces used to connect the power generation unit 504 and/or power storage 208 to the one or more loads 508. The converter 632c may be an interface from the power generation unit 504 or the power storage 208 into the loads 508. The converter 632c may be the same or similar to electric converter 632a as shown in FIG. 6. Similar to the discussion of the converter 632b in FIG. 7, the converter 632c may be eliminated, if the electric converter 632a, shown in FIG. 6, is present. However, the converter 632c may further condition or change the energy characteristics for the bus 802 for use by the loads 508. The converter 632c may also provide electrical energy to electric motor 804, which may power the vehicle 100.

The electric motor 804 can be any type of DC or AC electric motor. The electric motor may be a direct drive or induction motor using permanent magnets and/or winding either on the stator or rotor. The electric motor 804 may also be wireless or include brush contacts. The electric motor 804 may be capable of providing a torque and enough kinetic energy to move the vehicle 100 in traffic. In some embodiments, the electric motor 804 may be similar, if not identical, to the electric motor 212 described in conjunction with FIG. 2.

The different loads 508 may also include environmental loads 812, sensor loads 816, safety loads 820, user interaction loads 808, etc. User interaction loads 808 can be any energy used by user interfaces or systems that interact with the driver and/or passenger(s) of the vehicle 100. These loads 808 may include, for example, the heads up display 434, the dash display 420, 424, 428, the radio, user interfaces on the head unit, lights, radio, and/or other types of loads that provide or receive information from the occupants of the vehicle 100. The environmental loads 812 can be any loads used to control the environment within the vehicle 100. For example, the air conditioning or heating unit of the vehicle 100 can be environmental loads 812. Other environmental loads can include lights, fans, and/or defrosting units, etc. that may control the environment within, and/or outside of, the vehicle 100. The sensor loads 816 can be any loads used by sensors, for example, air bag sensors, GPS, and other such sensors used to either manage or control the vehicle 100 and/or provide information or feedback to the vehicle occupants. The safety loads 820 can include any safety equipment, for example, seat belt alarms, airbags, headlights, blinkers, etc. that may be used to manage the safety of the occupants of the vehicle 100. There may be more or fewer loads than those described herein, although they may not be shown in FIG. 8.

Figure 9:
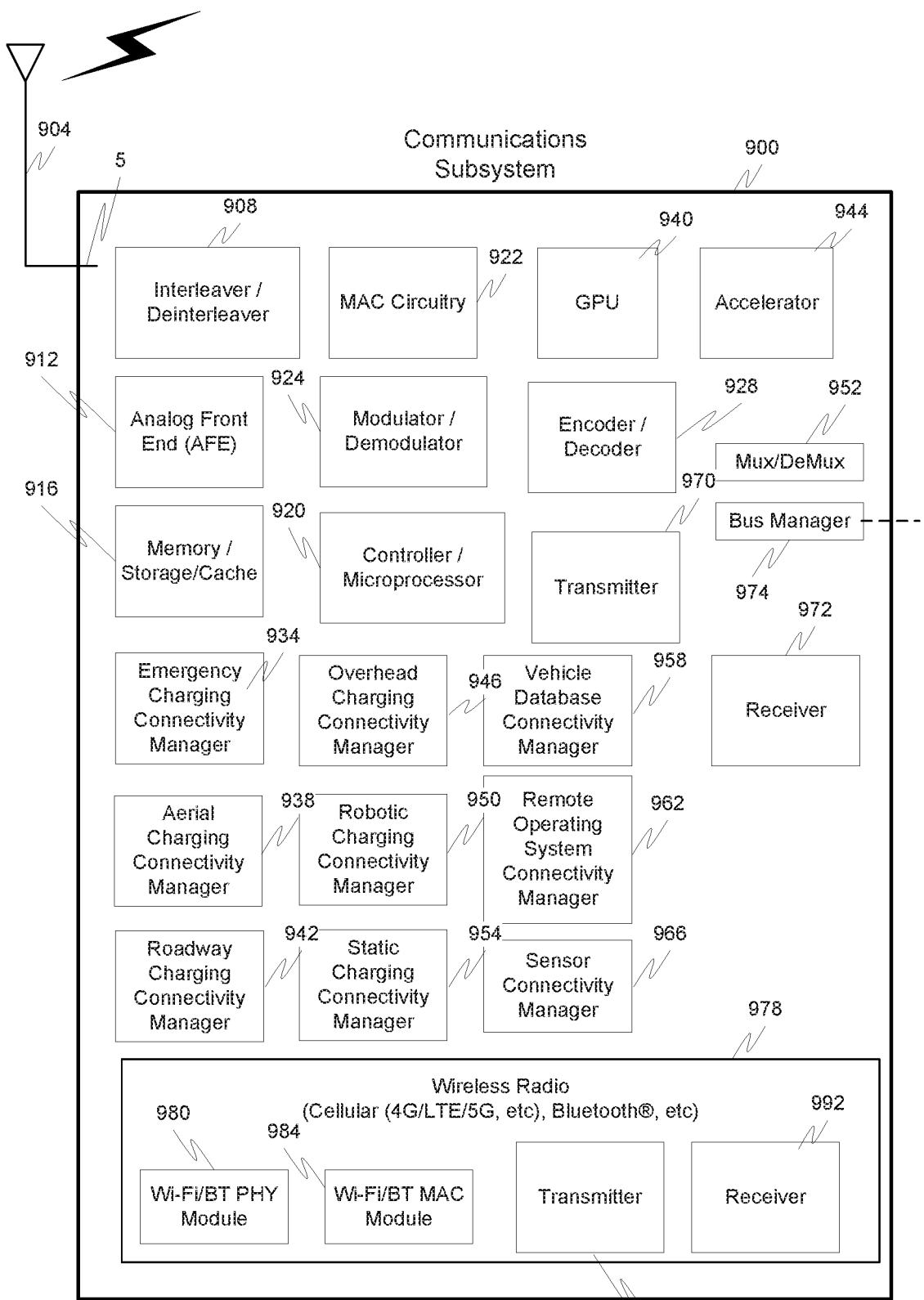
FIG. 9 is a block diagram of an embodiment of a communications subsystem of the vehicle.

FIG. 9 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager 974), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem enables communications between any if the inter-vehicle systems and subsystems as well as communications with non-collocated resources, such as those reachable over a network such as the Internet.

The communications subsystem 900, in addition to well-known componentry (which has been omitted for clarity), includes interconnected elements including one or more of: one or more antennas 904, an interleaver/deinterleaver 908, an analog front end (AFE) 912, memory/storage/cache 916, controller/microprocessor 920, MAC circuitry 922, modulator/demodulator 924, encoder/decoder 928, a plurality of connectivity managers 934-966, GPU 940, accelerator 944, a multiplexer/demultiplexer 952, transmitter 970, receiver 972 and wireless radio 978 components such as a Wi-Fi PHY/Bluetooth® module 980, a Wi-Fi/BT MAC module 984, transmitter 988 and receiver 992. The various elements in the device 900 are connected by one or more links/busses 5 (not shown, again for sake of clarity).

The device 400 can have one more antennas 904, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 904 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 904 generally interact with the Analog Front End (AFE) 912, which is needed to enable the correct processing of the received modulated signal and signal conditioning for a transmitted signal. The AFE 912 can be functionally located between the antenna and a digital baseband system in order to convert the analog signal into a digital signal for processing and vice-versa.

The subsystem 900 can also include a controller/microprocessor 920 and a memory/storage/cache 916. The subsystem 900 can interact with the memory/storage/cache 916 which may store information and operations necessary for configuring and transmitting or receiving the information described herein. The memory/storage/cache 916 may also be used in connection with the execution of application programming or instructions by the controller/microprocessor 920, and for temporary or long term storage of program instructions and/or data. As examples, the memory/storage/cache 920 may comprise a computer-readable device, RAM, ROM, DRAM, SDRAM, and/or other storage device(s) and media.

The controller/microprocessor 920 may comprise a general purpose programmable processor or controller for executing application programming or instructions related to the subsystem 900. Furthermore, the controller/microprocessor 920 can perform operations for configuring and transmitting/receiving information as described herein. The controller/microprocessor 920 may include multiple processor cores, and/or implement multiple virtual processors. Optionally, the controller/microprocessor 920 may include multiple physical processors. By way of example, the controller/microprocessor 920 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 900 can further include a transmitter 970 and receiver 972 which can transmit and receive signals, respectively, to and from other devices, subsystems and/or other destinations using the one or more antennas 904 and/or links/busses. Included in the subsystem 900 circuitry is the medium access control or MAC Circuitry 922. MAC circuitry 922 provides for controlling access to the wireless medium. In an exemplary embodiment, the MAC circuitry 922 may be arranged to contend for the wireless medium and configure frames or packets for communicating over the wired/wireless medium.

The subsystem 900 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 900 also includes a GPU 940, an accelerator 944, a Wi-Fi/BT/BLE PHY module 980 and a Wi-Fi/BT/BLE MAC module 984 and wireless transmitter 988 and receiver 992. In some embodiments, the GPU 940 may be a graphics processing unit, or visual processing unit, comprising at least one circuit and/or chip that manipulates and changes memory to accelerate the creation of images in a frame buffer for output to at least one display device. The GPU 940 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 934-966 (even) manage and/or coordinate communications between the subsystem 900 and one or more of the systems disclosed herein and one or more other devices/systems. The connectivity managers include an emergency charging connectivity manager 934, an aerial charging connectivity manager 938, a roadway charging connectivity manager 942, an overhead charging connectivity manager 946, a robotic charging connectivity manager 950, a static charging connectivity manager 954, a vehicle database connectivity manager 958, a remote operating system connectivity manager 962 and a sensor connectivity manager 966.

The emergency charging connectivity manager 934 can coordinate not only the physical connectivity between the vehicle 100 and the emergency charging device/vehicle, but can also communicate with one or more of the power management controller, one or more third parties and optionally a billing system(s). As an example, the vehicle 100 can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 934 can also communicate information, such as billing information to the emergency charging vehicle and/or a third party. This billing information could be, for example, the owner of the vehicle, the driver/occupant(s) of the vehicle, company information, or in general any information usable to charge the appropriate entity for the power received.

The aerial charging connectivity manager 938 can coordinate not only the physical connectivity between the vehicle 100 and the aerial charging device/vehicle, but can also communicate with one or more of the power management controller, one or more third parties and optionally a billing system(s). As an example, the vehicle 100 can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 938 can similarly communicate information, such as billing information to the aerial charging vehicle and/or a third party. This billing information could be, for example, the owner of the vehicle 100, the driver/occupant(s) of the vehicle 100, company information, or in general any information usable to charge the appropriate entity for the power received etc., as discussed.

The roadway charging connectivity manager 942 and overhead charging connectivity manager 946 can coordinate not only the physical connectivity between the vehicle 100 and the charging device/system, but can also communicate with one or more of the power management controller, one or more third parties and optionally a billing system(s). As one example, the vehicle 100 can request a charge from the charging system when, for example, the vehicle 100 needs or is predicted to need power. As an example, the vehicle 100 can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle 100, the driver/occupant(s) of the vehicle 100, company information, or in general any information usable to charge the appropriate entity for the power received etc., as discussed. The person responsible for paying for the charge could also receive a copy of the billing information as is customary. The robotic charging connectivity manager 950 and static charging connectivity manager 954 can operate in a similar manner to that described herein.

The vehicle database connectivity manager 958 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general any information stored in the vehicle database can optionally be shared with any one or more other devices optionally subject to any privacy or confidentially restrictions.

The remote operating system connectivity manager 962 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 966 facilitates communications between any one or more of the vehicle sensors and any one or more of the other vehicle systems. The sensor connectivity manager 966 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 10:
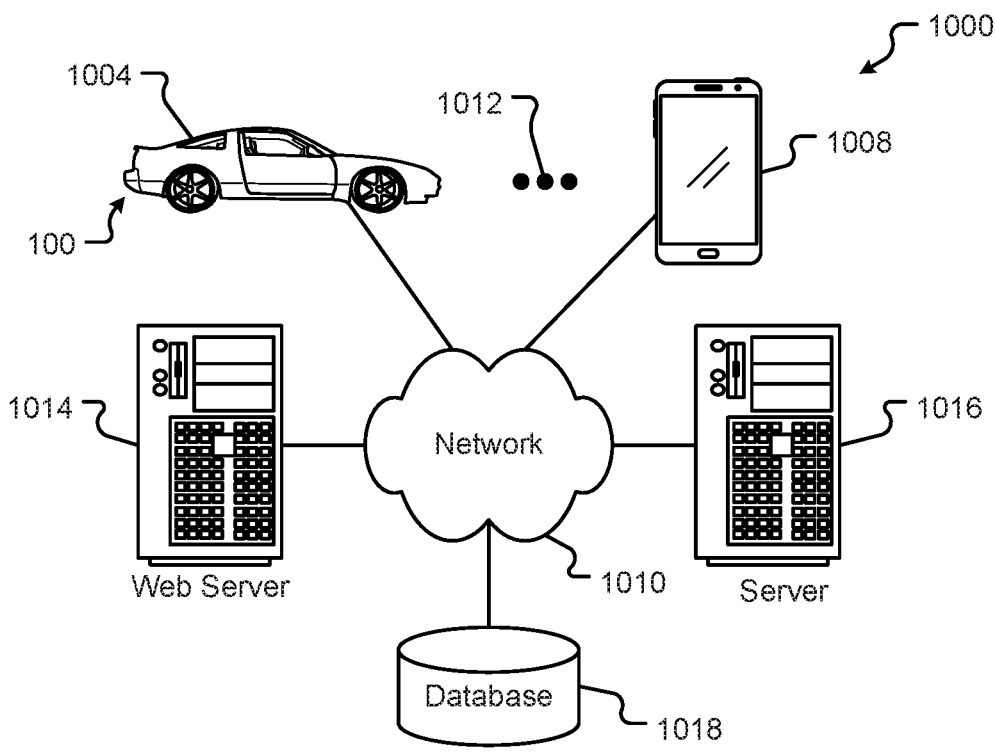
FIG. 10 is a block diagram of a computing environment associated with the embodiments presented herein.

FIG. 10 illustrates a block diagram of a computing environment 1000 that may function as the servers, user computers, or other systems provided and described herein. The environment 1000 includes one or more user computers, or computing devices, such as a vehicle computing device 1004, a communication device 1008, and/or more 1012. The computing devices 1004, 1008, 1012 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 1004, 1008, 1012 may also have any of a variety of applications, including for example, database client and/or server applications, and web browser applications. Alternatively, the computing devices 1004, 1008, 1012 may be any other electronic device, such as a thin-client computer, Internet-enabled mobile telephone, and/or personal digital assistant, capable of communicating via a network 1010 and/or displaying and navigating web pages or other types of electronic documents. Although the exemplary computer environment 1000 is shown with two computing devices, any number of user computers or computing devices may be supported.

Environment 1000 further includes a network 1010. The network 1010 may can be any type of network familiar to those skilled in the art that can support data communications using any of a variety of commercially-available protocols, including without limitation SIP, TCP/IP, SNA, IPX, AppleTalk, and the like. Merely by way of example, the network 1010 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 1014, 1016. In this example, server 1014 is shown as a web server and server 1016 is shown as an application server. The web server 1014, which may be used to process requests for web pages or other electronic documents from computing devices 1004, 1008, 1012. The web server 1014 can be running an operating system including any of those discussed above, as well as any commercially-available server operating systems. The web server 1014 can also run a variety of server applications, including SIP (Session Initiation Protocol) servers, HTTP(s) servers, FTP servers, CGI servers, database servers, Java servers, and the like. In some instances, the web server 1014 may publish operations available operations as one or more web services.

The environment 1000 may also include one or more file and or/application servers 1016, which can, in addition to an operating system, include one or more applications accessible by a client running on one or more of the computing devices 1004, 1008, 1012. The server(s) 1016 and/or 1014 may be one or more general purpose computers capable of executing programs or scripts in response to the computing devices 1004, 1008, 1012. As one example, the server 1016, 1014 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 1016 may also include database servers, including without limitation those commercially available from Oracle®, Microsoft®, Sybase®, IBM® and the like, which can process requests from database clients running on a computing device 1004, 1008, 1012.

The web pages created by the server 1014 and/or 1016 may be forwarded to a computing device 1004, 1008, 1012 via a web (file) server 1014, 1016. Similarly, the web server 1014 may be able to receive web page requests, web services invocations, and/or input data from a computing device 1004, 1008, 1012 (e.g., a user computer, etc.) and can forward the web page requests and/or input data to the web (application) server 1016. In further embodiments, the server 1016 may function as a file server. Although for ease of description, FIG. 10 illustrates a separate web server 1014 and file/application server 1016, those skilled in the art will recognize that the functions described with respect to servers

1014, 1016 may be performed by a single server and/or a plurality of specialized servers, depending on implementation-specific needs and parameters. The computer systems 1004, 1008, 1012, web (file) server 1014 and/or web (application) server 1016 may function as the system, devices, or components described in FIGS. 1-10.

The environment 1000 may also include a database 1018. The database 1018 may reside in a variety of locations. By way of example, database 1018 may reside on a storage medium local to (and/or resident in) one or more of the computers 1004, 1008, 1012, 1014, 1016. Alternatively, it may be remote from any or all of the computers 1004, 1008, 1012, 1014, 1016, and in communication (e.g., via the network 1010) with one or more of these. The database 1018 may reside in a storage-area network ("SAN") familiar to those skilled in the art. Similarly, any necessary files for performing the functions attributed to the computers 1004, 1008, 1012, 1014, 1016 may be stored locally on the respective computer and/or remotely, as appropriate. The database 1018 may be a relational database, such as Oracle 20i®, that is adapted to store, update, and retrieve data in response to SQL-formatted commands.

Figure 11:
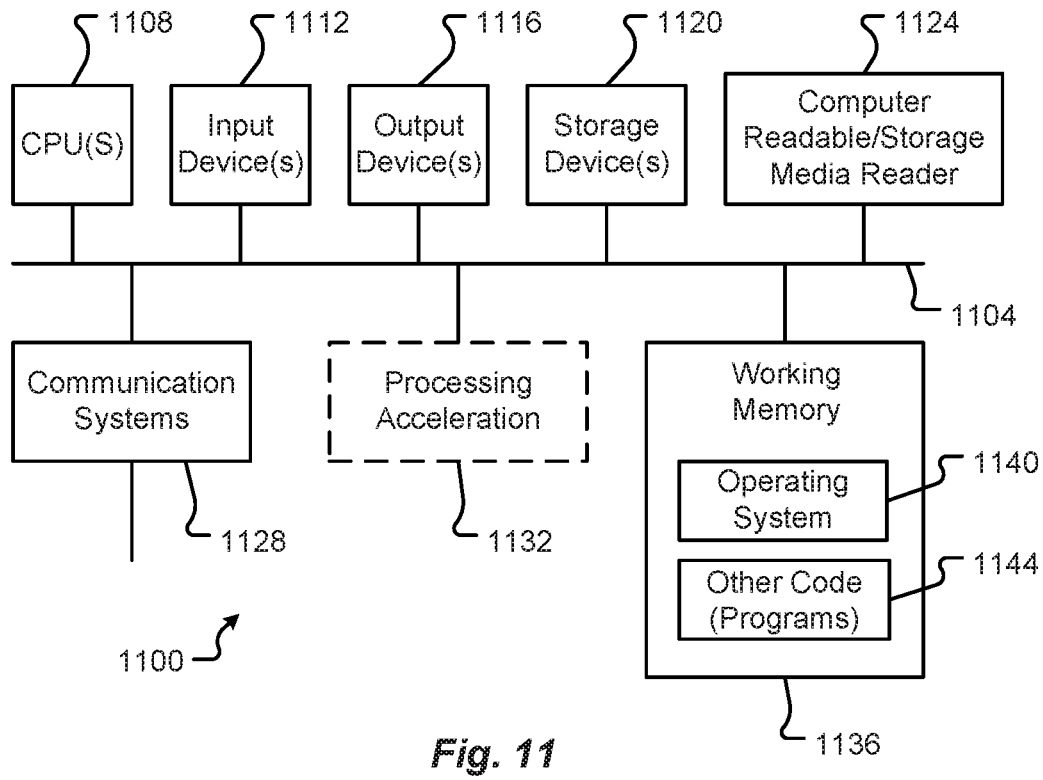
FIG. 11 is a block diagram of a computing device associated with one or more components described herein.

FIG. 11 illustrates one embodiment of a computer system 1100 upon which the servers, user computers, computing devices, or other systems or components described above may be deployed or executed. The computer system 1100 is shown comprising hardware elements that may be electrically coupled via a bus 1104. The hardware elements may include one or more central processing units (CPUs) 1108; one or more input devices 1112 (e.g., a mouse, a keyboard, etc.); and one or more output devices 1116 (e.g., a display device, a printer, etc.). The computer system 1100 may also include one or more storage devices 1120. By way of example, storage device(s) 1120 may be disk drives, optical storage devices, solid-state storage devices such as a random access memory ("RAM") and/or a read-only memory ("ROM"), which can be programmable, flash-updateable and/or the like.

The computer system 1100 may additionally include a computer-readable storage media reader 1124; a communications system 1128 (e.g., a modem, a network card (wireless or wired), an infra-red communication device, etc.); and working memory 1136, which may include RAM and ROM devices as described above. The computer system 1100 may also include a processing acceleration unit 1132, which can include a DSP, a special-purpose processor, and/or the like.

The computer-readable storage media reader 1124 can further be connected to a computer-readable storage medium, together (and, optionally, in combination with storage device(s) 1120) comprehensively representing remote, local, fixed, and/or removable storage devices plus storage media for temporarily and/or more permanently containing computer-readable information. The communications system 1128 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1100 may also comprise software elements, shown as being currently located within a working memory 1136, including an operating system 1140 and/or other code 1144. It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1108 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 12:
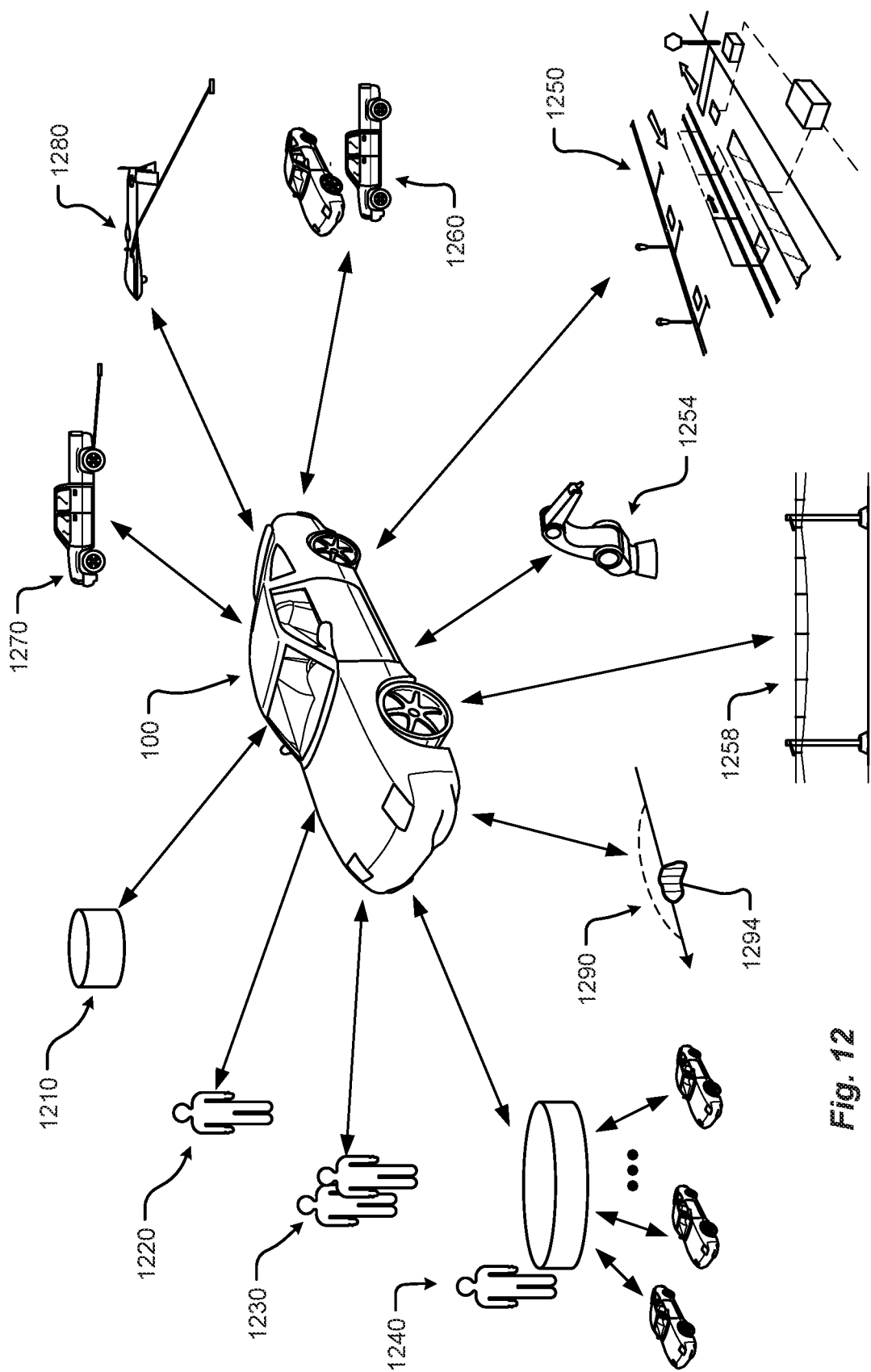
FIG. 12 shows a vehicle in an environment in accordance with embodiments of the present disclosure.

Referring to FIG. 12, the vehicle 100 is shown in a plurality of operational and/or charging environments. The vehicle 100 may operate in any one or more of the depicted environments in any combination. Other embodiments are possible but may not be depicted in FIG. 12. Generally, the vehicle 100 may operate in environments which enable charging of the vehicle 100 and/or operation of the vehicle 100. More specifically, the vehicle 100 may receive a charge via one or more means comprising emergency charging vehicle system 1270, aerial vehicle charging system 1280, roadway system 1250, robotic charging system 1254, and/or overhead charging system 1258. The vehicle 100 may interact and/or operate in an environment comprising one or more other roadway vehicles 1260. The vehicle 100 may engage with elements within the vehicle 100 comprising vehicle driver 1220, vehicle passengers 1230, and/or a vehicle database 1210. In one embodiment, vehicle database 1210 may not physically reside in the vehicle 100 and may instead be accessed remotely (e.g., by wireless communication, etc.), and as such, may reside in another location such as a residence or business location. The vehicle 100 may operate autonomously and/or semi-autonomously in an autonomous environment 1290 (here, depicted as a roadway environment presenting a roadway obstacle 1294 of which the vehicle 100 autonomously identifies and steers the vehicle 100 clear of the obstacle 1294). Furthermore, the vehicle 100 may engage with a remote operator system 1240, which may provide fleet management instructions or control.

In some embodiments, the vehicle 100 may be configured to receive charge via one or more compatible vehicle charging interfaces, such as one or more charging panels and/or interconnections. These compatible vehicle charging interfaces may be configured at one or more locations on, in, or about a vehicle 100. For instance, the locations may include locations on the vehicle 100 wherein charging may be received, via a vehicle roof 130, vehicle side 160 and vehicle lower or undercarriage 140.

Figure 13:
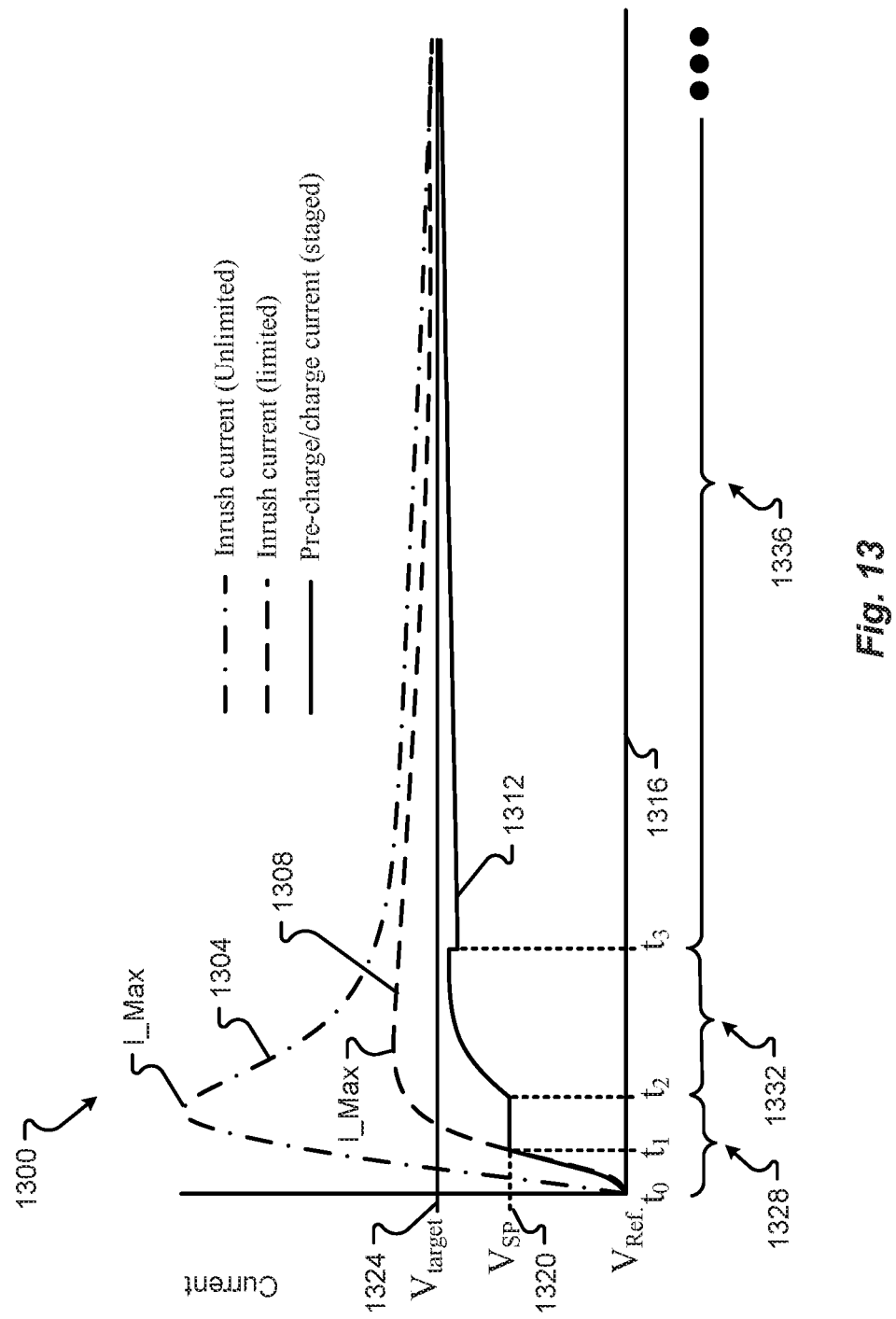
FIG. 13 is a graph of voltages associated with one or more components described herein.

FIG. 13 illustrates graph 1300 of voltages associated with one or more components described herein. Graph 1300 comprises reference voltage 1316, such as a zero voltage. It should be appreciated that in other embodiments reference voltage 1316 may be greater than zero, but less than set-point voltage 1320.

Plot 1304 illustrates an unrestricted voltage between a low voltage load and a high voltage supply when connected without any inflow limiters. Plot 1304 initially extends well beyond target voltage 1324 before settling down. Such excessive voltage may damage components. Plot 1308 utilizes a conventional inflow limiter to prevent the initial voltage from reaching levels, such as those illustrated by plot 1304.

Plot 1312 illustrates a voltage between a HV source (e.g., power generation unit 504) and primary HV load (e.g., power storage 208) when connected with benefit of the embodiments disclosed herein. In one embodiment, reverence voltage 1316 is zero. In other embodiments reference voltage 1316 is value between zero and set-point reference 1320. Set-point reference 1320 is selected to be a non-zero value below target voltage 1324. Additionally or alternatively, set-point reference 1320 is selected to apply a sufficient voltage to high-voltage components to enable such components to determine and report the voltage and/or any other pre-charge self-tests, but low enough that, should there be a fault, the risk to persons (e.g., occupants 230, driver 220, bystanders, etc.) and property (e.g., vehicle 100, components of vehicle 100, external components that may come into contact with vehicle 100, etc.) from an exposed voltage is minimized.

In another embodiment, first state 1328 applies set-point voltage 1320 to the HV load. The voltage increases from reference voltage 1316 to set-point voltage 1320 during time $t_0$ to time $t_1$. The voltage is held, from time $t_1$ to time $t_2$, during which time at least one secondary HV load, determines and reports its observed voltage. In another embodiment, all secondary HV load determine and report their respective observed voltage. First step 1328 ends when each reporting HV load indicates a value at, or within a previously determined acceptable range of, set-point voltage 1320. Second state 1332 then continues, whereby the voltage is increased to, or within a previously determined acceptable range of, target voltage 1324 at time t3.

Following stage 1332, pre-charge is complete and main connections may be closed to facilitate charging at charging state 1336 until such time as charging is complete or otherwise interrupted.

Reporting by HV components is variously embodied. Reporting may be a raw data values (e.g., "27.9V"), binary (e.g., "1"=good, "0"=bad), and/or other value or combination of values which may be provided in response to polling or provided continuously or intermittently.

Figure 14:
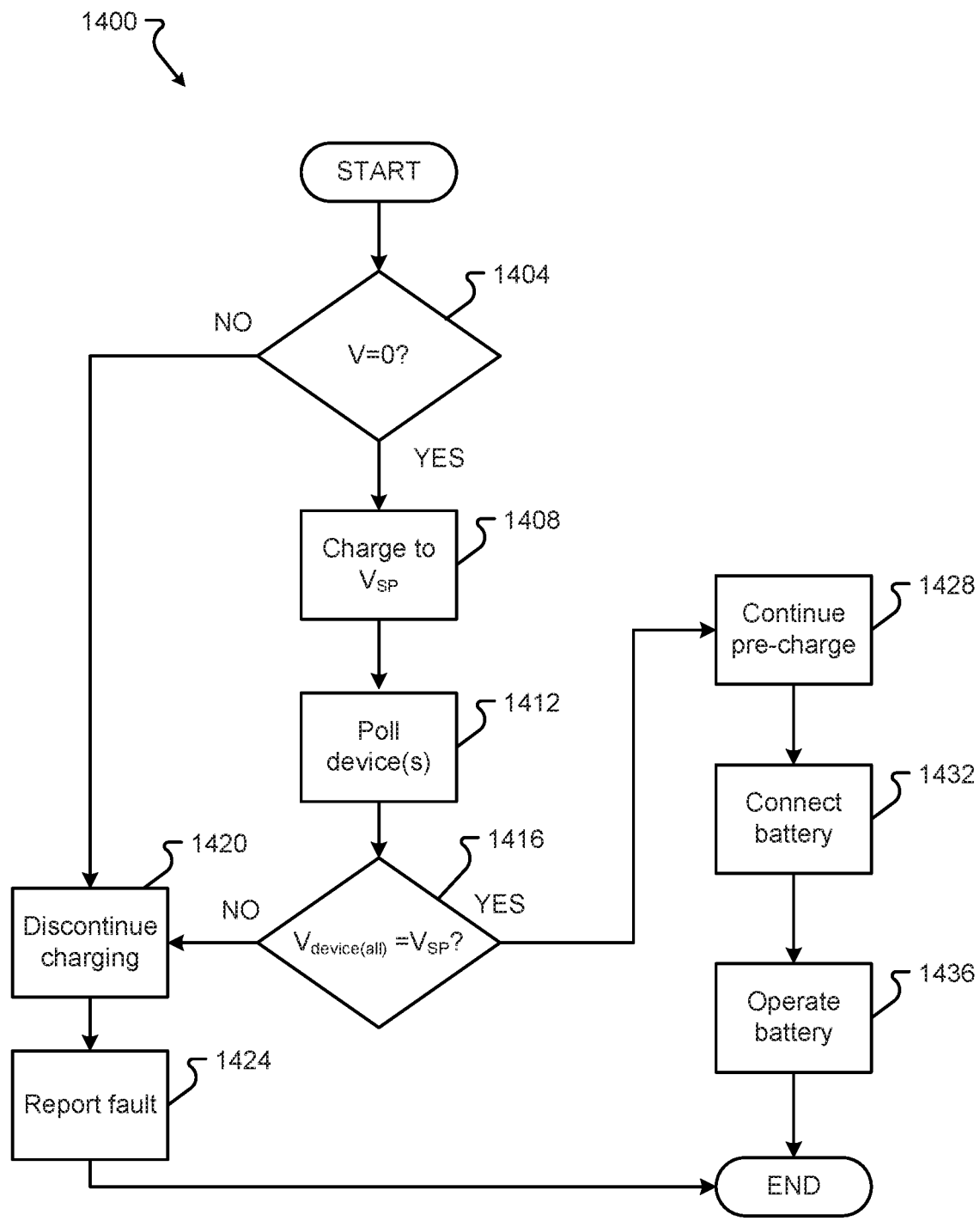
FIG. 14 is a first charging process associated with one or more embodiments described herein.
Figure 15:
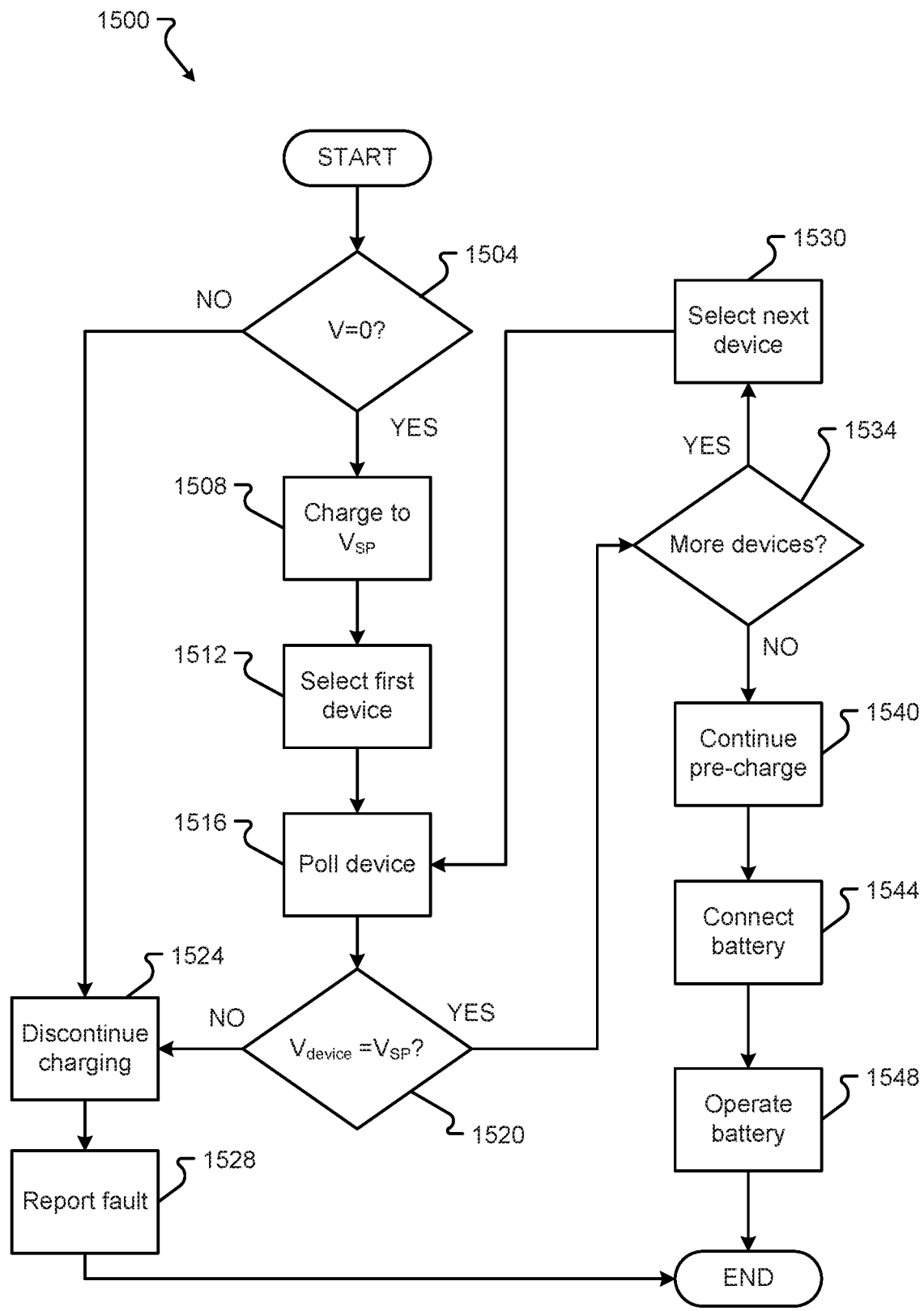
FIG. 15 is a second charging process associated with one or more embodiments described herein.

FIG. 14 illustrates charging process 1400 associated with one or more embodiments described herein. In one embodiment, process 1400 begins with step 1404 determining the voltage at a line, having connected thereto one or more loads, is zero. In another embodiment, step 1404 determines if the voltage is a non-zero reference voltage (e.g., reference voltage 1316). In another embodiment, step 1404 determines if the voltage is less than a set-point value (e.g., set-point voltage 1320). If step 1404 is determined in the negative, process 1400 may then continue to step 1420 wherein step 1420 terminates charging and/or step 1424 reports a fault.

If step, 1404 is determined in the affirmative, processing may continue to step 1408. In step 1408, a set-point voltage 1320 is applied to the line. Set-point voltage 1320 is a not-zero voltage selected as sufficient to allow loads on the line to determine and report their observed voltage. Set-point voltage 1320 is a non-zero voltage less than target high-voltage (HV) 1324. In another embodiment, set-point voltage 1320 is a voltage between zero and 60V.

In one embodiment, a step 1408 includes a delay to allow for a passage of time selected as sufficient to raise the voltage of the line to set-point voltage 1320. In another embodiment, the voltage on the line is measured and step 1408 is completed upon the voltage reaching set-point voltage 1320. Then, in step 1412, devices that comprise loads on the line are polled and/or report their observed voltage. In one embodiment, step 1416 determines if the device voltage is equivalent to set-point voltage 1320. In another embodiment, step 1416 determines the device voltage is equivalent to set-point voltage 1320, upon determining the device voltage is within a previously determined acceptable range of set-point voltage 1320. If step 1416 determines, at least one, device on the line is not at, or is outside of the acceptable range, of set-point voltage 1320 may be determined in the negative and processing continues to discontinue charging and/or report a fault in steps 1420 and/or 1424, respectively. If step 1416 determines all voltages, as reported by all the devices are at, or are within the acceptable range, of set-point voltage 1320, processing continues to step 1428.

Step 1428 then continues with the pre-charge, such as by application of a voltage greater than set-point voltage 1320. In another embodiment, the pre-charge is continued by applying a voltage less than the HV but greater than set-point voltage 1320. In yet another embodiment, target voltage 1324 is applied in step 1428. Step 1428 completes, such as to bring the voltage up to a level whereby a battery (e.g., one of the loads on the line) may be connected without an undue inflow current. Step 1432 connects the battery to the HV supply and operation of the battery proceeds in step 1436, after which process 1400 may end. Step 1436, in one embodiment, is a charging of the battery. In another embodiment, step 1436 is a discharge of the battery. In another embodiment, step 1436 is idle (e.g., connected to a component presently at the same potential).

Figure 16:
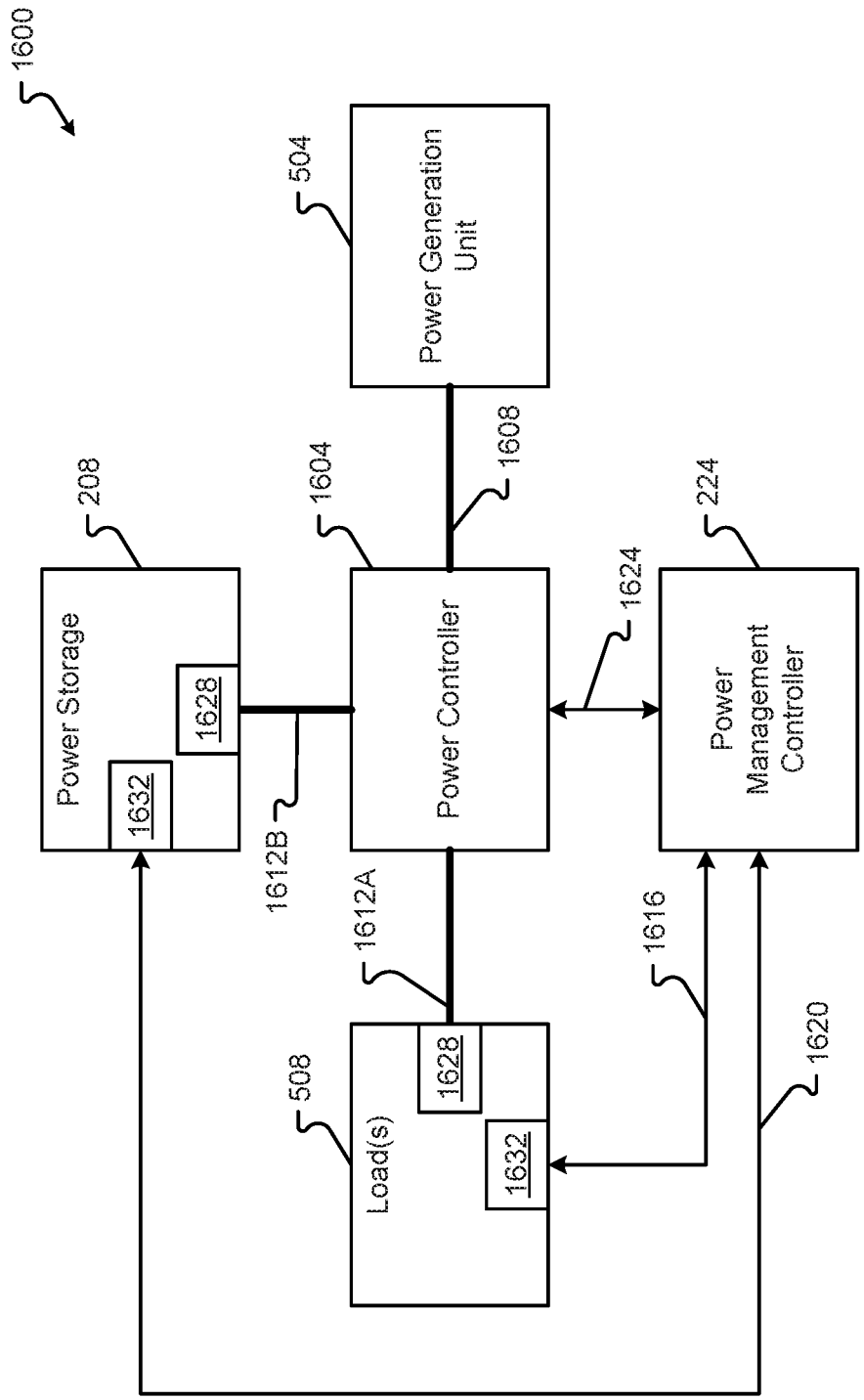
FIG. 16 is a block diagram of components associated with one or more embodiments described herein.

FIG. 16 illustrates charging process 1500 associated with one or more embodiments described herein. In one embodiment, process 1500 begins with step 1504 determining the voltage at a line, having connected thereto one or more loads, is zero. In another embodiment, step 1504 determines if the voltage is a non-zero reference voltage (e.g., reference voltage 1316). In another embodiment, step 1504 determines if the voltage is less than a set-point value (e.g., set-point voltage 1320). If step 1504 is determined in the negative, process 1500 may then continue to step 1524 wherein step 1524 terminates charging and/or step 1428 reports a fault.

If step, 1504 is determined in the affirmative, processing may continue to step 1508. In step 1508, a set-point voltage 1320 is applied to the line. Set-point voltage 1320 is a not-zero voltage selected as sufficient to allow loads on the line to determine and report their observed voltage. Set-point voltage 1320 is a non-zero voltage less than target high-voltage (HV) 1324. In another embodiment, set-point voltage 1320 is a voltage between zero and 60V.

In one embodiment, a step 1508 includes a delay to allow for a passage of time selected as sufficient to raise the voltage of the line to set-point voltage 1320. In another embodiment, the voltage on the line is measured and step 1508 is completed upon the voltage reaching set-point voltage 1320. Then, in step 1512, a first device, that comprise a load on the line, is selected. In step 1516, the device selected in step 1512 is polled for its observed voltage. Alternatively, the voltage from the polled device is received in step 1516.

In one embodiment, step 1520 determines if the device voltage is equivalent to set-point voltage 1320. In another embodiment, step 1520 determines the selected device's observed voltage is equivalent to set-point voltage 1320, upon determining the device voltage is within a previously determined acceptable range of set-point voltage 1320. If step 1520 determines the device's reported voltage is not at, or is outside of the acceptable range, of set-point voltage 1320, step 1520 may be determined in the negative and processing continues to discontinue charging and/or report a fault in steps 1524 and/or 1528, respectively. If step 1520 determines the reported voltage by the device selected in step 1512 is at, or is within the acceptable range, of set-point voltage 1320, processing continues to step 1534.

Step 1534 determines if there are more devices who need to be polled and/or their observed voltages need processing. If step 1534 is determined in the affirmative, step 1530 selects the next device and, and least, steps 1516, 1520 are performed with the next device. If step 1534 is determined in the negative processing continues to step 1540.

Step 1540 then continues with the pre-charge, such as by application of a voltage greater than set-point voltage 1320. In another embodiment, the pre-charge is continued by applying a voltage less than the HV but greater than set-point voltage 1320. In yet another embodiment, target voltage 1324 is applied in step 1540. Step 1540 completes, such as to bring the voltage up to a level whereby a battery (e.g., one of the loads on the line) may be connected without an undue inflow current. Step 1544 connects the battery to the HV supply and operating of the battery proceeds in step 1548, after which process 1500 may end. Step 1548, in one embodiment, is a charging of the battery. In another embodiment, step 1548 is a discharge of the battery. In another embodiment, step 1548 is idle (e.g., connected to a component presently at the same potential).

FIG. 16 is a block diagram 1600 of components associated with one or more embodiments described herein. In one embodiment, power controller 1604 is connected, via source line 1608, to power generation unit 504. Power controller 1604 selectively applies a voltage from reference voltage 1316 to target voltage 1324, from power generation unit 504, to load line 1612B. Source line 1608 and/or load line 1612 are configured for high-voltage operations.

Power controller 1604 receives an input from power management controller 224, such as to initiate, terminate, and/or increase the voltage on load line 1612. Additionally, power controller 1604, upon an associated input from power management controller 224, connects power storage 208 to power generation unit 504 at a voltage (e.g., target voltage 1324) supplied by power generation unit 504, which power storage 208 comprises a battery.

Load(s) 508 and/or power storage 208 are initially supplied with reference voltage 1316. Signal line 1616 from load(s) 508 are then utilized to report and/or poll their observed voltage. In another embodiment, power storage 208 is one embodiment of a load, such that signal line 1620 is utilized to report and/or poll power storage 208 for the observed voltage thereby. Load(s) 508 and/or power storage 208 may comprise voltage meter 1628 and communication interface 1632, such as to communicate with power management controller 224. Voltage meter 1628 observes a voltage on load line 1612 for reporting via communication interface 1632. Voltage meter 1632 may comprise a variable meter (e.g., voltage values as observed), an enumerated detector (e.g., 0, below_ref_v, at_ref_v, below_target_v, at_target_v, above_target_v, etc.), and/or other detection value for reporting via communication interface 1632. Communication interface 1632 may receive a polling instruction and, in response thereto, reply with the observed voltage by voltage meter 1628. Additionally or alternatively, communication interface 1632 may continuously or periodically provide the observed voltage value to signal line 1620 and/or 1616.

Should power management 224 determine the observed voltages by load(s) 508 and/or power storage 208 are at, or within the acceptable range, of reference voltage 1316, power management 224 may signal power controller 1604, via signal line 1624, to continue raising the voltage to target voltage 1324. Thereafter, power management controller 224 may signal power controller 1304 to connect power storage 208 to power generation unit 504 via supply line 1608 and load line 1612B. Optionally, power controller may cause power to load(s) 508 to be discontinued on load line 1612A.

FIG. 17 is a schematic of resistor network 1700 associated with one or more embodiments described herein. Power controller 1604 may comprise or control one or more resistors 1708A-P on power bus 1704 to selectively control the power provided to power storage 208 from power generation unit 504. One or more switches 1712A-o (lower case "o" is used herein to avoid potential confusion that may result with upper case "O" and "zero," similarly lower case "i" is used to avoid potential confusion that may result with upper case "I" and "one"), controls at least one corresponding resistor 1716 and/or 1712A-o. It should be noted that resistor 1716 is a direct connection and provides zero ohms of resistance, such that when switch 1708A is closed, power generation unit 504 is directly connected to power storage 208.

In another embodiment, each of switch 1708A-P are open, thereby electrically isolating power storage 208 from power generation unit 504. In another embodiment, at least one of switches 1708B-1708P are closed, thereby causing the circuit to utilize at least one resistor 1712A-o and thereby limit the power provided to power storage 208 from power generation unit 504.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the above systems include: a voltage source; a source line connected to the voltage source; a primary load; a secondary load; a load line connected to the primary load and the secondary load; a controller, disposed between the source line and the load line, the controller being configured to selectively supply a voltage, from the source line, to the load line; and wherein the controller supplies a first voltage to the load line, the first voltage being greater than zero and less than a target voltage, and while supplying the first voltage, a signal is received from the secondary load indicating a reported voltage at the secondary load; and wherein the controller receives the signal and, upon the controller determining the signal indicates the reported voltage as being substantially equivalent to the first voltage, supplies a second voltage to the load line, the second voltage being greater than the first voltage.

Embodiments of the above vehicle include: A vehicle, comprising: a voltage source; a source line connected to the voltage source; a communication line; a power supply, the power supply comprising a battery and a voltage detector and an interface to the communication line; a load line connected to the battery; a controller, disposed between the source line and the load line, the controller being configured to selectively supply a voltage, from the source line, to the load line; and wherein the controller supplies a first voltage to the load line, the first voltage being greater than zero and less than a target voltage, and while supplying the first voltage, a signal is received from voltage detector indicating a reported voltage as observed by the voltage detector; and wherein the controller receives the signal and, upon the controller determining the signal indicates the reported voltage as being substantially equivalent to the first voltage, supplies a second voltage to the load line, the second voltage being greater than the first voltage.

Embodiments of the above method, include: applying a set-point voltage to a load line, comprising a device electrically connected thereto; after applying the set-point voltage, receiving an observed voltage from the device; and upon determining the set-point voltage is being observed at the device, applying a target voltage, higher than the set-point voltage, to the load line.

Aspects of the embodiments also include, wherein the second voltage is less than or equal to the target voltage.

Aspects of the embodiments also comprises a switch disposed between the primary load and the load line and, upon determining the voltage of the load line is substantially equivalent to the target voltage, closing the switch to allow the primary load to be at the same voltage as the load line.

Aspects of the embodiments also include, wherein the primary load is a rechargeable battery.

Aspects of the embodiments also include, wherein the secondary load, absent the voltage source, is powered by the primary load.

Aspects of the embodiments also include, wherein the controller, upon the controller determining the signal does not indicate the reported voltage as being substantially equivalent to the first voltage, discontinues supplying any voltage to the load line.

Aspects of the embodiments also include, wherein the signal does not indicate the reported voltage as being substantially equivalent to the first voltage at a time after a previously established delay.

Aspects of the embodiments also include, further comprising: a tertiary load connected to the load line; and wherein the controller supplies the first voltage to the load line, and while supplying the first voltage, the signal is received indicating the voltage detected at the secondary load and tertiary load; wherein the controller receives the signal and, upon the controller determining the signal indicates the voltage detected at the secondary load and the tertiary load is substantially equivalent to the first voltage, supplies the second voltage to the load line.

Aspects of the embodiments also include, a tertiary load connected to the load line; and wherein the controller, upon determining the signal indicates the voltage detected at the secondary load is substantially equivalent to the first voltage, supplies the first voltage to the tertiary load.

Aspects of the embodiments also include, wherein, following the supply of the first voltage to the tertiary load, the signal indicates the voltage detected at the tertiary load.

Aspects of the embodiments further comprise, the controller, after the second voltage has been applied to the load line, directly connects the battery to the voltage source.

Aspects of the embodiments also comprise a component configured to detect and report an observed voltage on the load line; and wherein the controller supplies the first voltage, via the load line, to the component; wherein, in response to the first voltage, the controller receives the signal comprising indicia of the observed voltage from the component; and wherein upon the controller determining the signal indicates the reported voltage as being substantially equivalent to the first voltage, supplies the second voltage to the load line.

Aspects of the embodiments also include, wherein the controller upon failing to receive the signal, disconnects the source line from the voltage source.

Aspects of the embodiments also include, wherein a voltage supply, via a controller, provides at least one of the set-point voltage or the target voltage to the load line.

Aspects of the embodiments also include, connecting a battery to the voltage supply, upon the controller having applied the target voltage to the line.

Aspects of the embodiments also include, wherein the device comprises a battery.

Aspects of the embodiments also include, the device comprises a plurality of devices; and after applying the set-point voltage, receiving an observed voltage from each of the plurality of devices; and upon determining the set-point voltage is being observed at each of the plurality of devices, applying the target voltage, higher than the set-point voltage to the load line.

Aspects of the embodiments also include, wherein receiving the observed voltage is a response to a polling.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A system, comprising:
   a voltage source;
   a source line connected to the voltage source;
   a primary load;
   a secondary load;
   a load line connected to the primary load and the secondary load and wherein the primary load is initially not connected to the load line;
   a controller, disposed between the source line and the load line, the controller being configured to selectively supply a voltage, from the source line, to the load line; and
   wherein the controller supplies a first voltage to the load line, the first voltage being greater than zero and less than a target voltage, and while supplying the first voltage, a first signal is received from the secondary load indicating a reported voltage at the secondary load;
   wherein the controller receives the first signal and, upon the controller determining that the first signal indicates the reported voltage as being substantially equivalent to the first voltage, supplies a second voltage to the load line, the second voltage being greater than the first voltage; and
   wherein the controller receives a second signal and, upon the controller determining that the second signal indicates the reported voltage as being substantially equivalent to the second voltage, supplies the target voltage to the load line and, after the target voltage is applied to the load line, connecting the primary load to the load line.

2. The system of claim 1, wherein the second voltage is less than the target voltage.

3. The system of claim 1, further comprises a switch disposed between the primary load and the load line and connecting the primary load to the load line comprises closing the switch to allow the primary load to be at a same voltage as the load line.

4. The system of claim 1, wherein the primary load is a rechargeable battery.

5. The system of claim 1, wherein the secondary load, absent the voltage source, is powered by the primary load.

6. The system of claim 1, wherein the controller, upon the controller determining the first signal does not indicate the reported voltage as being substantially equivalent to the first voltage, discontinues supplying any voltage to the load line.

7. The system of claim 6, wherein the first signal does not indicate the reported voltage as being substantially equivalent to the first voltage at a time after a previously established delay.

8. The system of claim 1, further comprising:
a tertiary load connected to the load line; and
wherein the controller supplies the first voltage to the load line, and while supplying the first voltage, the first signal is received indicating the voltage detected at the secondary load and tertiary load;
wherein the controller receives the first signal and, upon the controller determining the first signal indicates the voltage detected at the secondary load and the tertiary load is substantially equivalent to the first voltage, supplies the second voltage to the load line.

9. The system of claim 1, further comprising:
a tertiary load connected to the load line; and
wherein the controller, upon determining the first signal indicates the voltage detected at the secondary load is substantially equivalent to the first voltage, supplies the first voltage to the tertiary load.

10. The system of claim 9, wherein, following the supply of the first voltage to the tertiary load, the first signal indicates the voltage detected at the tertiary load.

11. A vehicle, comprising:
a voltage source;
a source line connected to the voltage source;
a communication line;
a power supply, the power supply comprising a battery and a voltage detector and an interface to the communication line;
a load line connected to the battery;
a controller, disposed between the source line and the load line, the controller being configured to selectively supply a voltage, from the source line, to the load line and wherein the battery is initially not connected to the load line; and
wherein the controller supplies a first voltage to the load line, the first voltage being greater than zero and less than a target voltage, and while supplying the first voltage, a first signal is received from voltage detector indicating a reported voltage as observed by the voltage detector;
wherein the controller receives the first signal and, upon the controller determining that the first signal indicates the reported voltage as being substantially equivalent to the first voltage, supplies a second voltage to the load line, the second voltage being greater than the first voltage; and
wherein the controller receives a second signal and, upon the controller determining that the second signal indicates the reported voltages as being substantially equivalent to the second voltage, supplies the target voltages to the load line and, after the target voltage is applied to the load line, connects the battery to the load line.

12. The vehicle of claim 11, further comprising, the controller, after the second voltage has been applied to the load line, directly connects the battery to the voltage source.

13. The vehicle of claim 11, further comprising:
a component configured to detect and report an observed voltage on the load line; and
wherein the controller supplies the first voltage, via the load line, to the component;
wherein, in response to the first voltage, the controller receives a signal comprising indicia of the observed voltage from the component; and
wherein upon the controller determining the signal indicates the reported voltage as being substantially equivalent to the first voltage, supplies the second voltage to the load line.

14. The vehicle of claim 13, wherein the controller upon failing to receive, disconnects the source line from the voltage source.

15. A method, comprising:
applying a set-point voltage to a load line, comprising a device electrically connected thereto, wherein the set-point voltage is greater than zero and less than a target voltage
receiving, while applying the set-point voltage, a first signal comprising an observed voltage at the device; and
upon determining from the first signal that the set-point voltage is being observed at the device, applying a second voltage, the second voltage being higher than the set-point voltage, to the load line; and
upon receiving a second signal comprising the observed voltage at the device and upon determining that the second signal indicates the observed voltage as being substantially equivalent to the second voltage, suppling the target voltage to the load line and, after applying the target voltage, connecting the device to the load line.

16. The method of claim 15, wherein a voltage supply, via a controller, provides at least one of the set-point voltage or the target voltage to the load line.

17. The method of claim 16, further comprising:
connecting a battery to the voltage supply, upon the controller having applied the target voltage to the load line.

18. The method of claim 15, wherein the device comprises a battery selectively connected to the load line with a switch.

19. The method of claim 15, wherein:
the device comprises a plurality of devices; and
after applying the set-point voltage, receiving the second signal comprising an observed voltage from each of the plurality of devices; and
upon determining the set-point voltage is being observed at each of the plurality of devices, applying the target voltage, higher than the set-point voltage, to the load line.

20. The method of claim 15, wherein receiving at least one of the first signal or the second signal comprises receiving a response to a polling of the device.

* * * * *